US005938775A

United States Patent [19]
Damani et al.

[11] Patent Number: 5,938,775
[45] Date of Patent: Aug. 17, 1999

[54] DISTRIBUTED RECOVERY WITH κ-OPTIMISTIC LOGGING

[75] Inventors: Om P. Damani; Vijay Kumar Garg, both of Austin, Tex.; Yi-Min Wang, Bellevue, Wash.

[73] Assignee: AT & T Corp., Middletown, N.J.

[21] Appl. No.: 09/054,572

[22] Filed: Apr. 3, 1998

Related U.S. Application Data

[63] Continuation of application No. 08/863,065, May 23, 1997.

[51] Int. Cl.$^6$ ....................................................... G06F 11/14
[52] U.S. Cl. ................................................ 714/15; 714/16
[58] Field of Search ........................ 395/182.13, 182.14, 395/182.15, 182.17; 364/285.2

[56] References Cited

U.S. PATENT DOCUMENTS

| | | |
|---|---|---|
| 4,570,261 | 2/1986 | Maher . |
| 4,665,520 | 5/1987 | Strom et al. . |
| 5,396,613 | 3/1995 | Hollaar . |
| 5,440,726 | 8/1995 | Fuchs et al. . |
| 5,485,608 | 1/1996 | Lomet et al. . |
| 5,530,802 | 6/1996 | Fuchs et al. . |
| 5,590,277 | 12/1996 | Fuchs et al. . |
| 5,630,047 | 5/1997 | Wang ................................ 395/182.13 |

OTHER PUBLICATIONS

Wang et al., "Optimistic Message Logging for Independent Checkpointing in Message–Passing Systems", IEEE, pp. 147–154, 1992.

ACM Transactions on Computer Systems, vol. 7, No. 1, Feb. 1989, pp. 1–24, by Anita Borg et al., "Fault Tolerance Under UNIX".

Proceedings of 16th Int'l Conference on Distributed Computing Systems, May 27–30, 1996, IEEE Computer Society Press, pp. 108–115, O. P. Damani et al., "How to Recover Efficiently and Asynchronously when Optimism Fails".

(List continued on next page.)

*Primary Examiner*—Robert W. Beausoliel, Jr.
*Assistant Examiner*—Scott T. Baderman

[57] ABSTRACT

A fault tolerant message passing system includes a plurality of interconnected processors with storage and a watchdog process wherein the processors may undergo failure. A method restores a consistent system state using optimistic logging protocol with asynchronous recovery. Each process comprises a sequence of state intervals and includes checkpoints for saving in storage the state of the process sufficient to re-start execution of the process. Non-deterministic event messages are logged in storage by each process for replay after process re-start to reconstruct pre-failure state intervals. Transitive dependency tracking of messages and process states is performed to record the highest-index state interval of each process upon which a local process depends. A variable size dependency vector is attached to each outgoing message sent between processes. An integer K is assigned to each outgoing message as the upper bound on the vector size. The vector for the local process is updated upon receiving each incoming message. A process failure is detected and the failed process is re-started. The latest checkpoint is restored and the logged messages are replayed. A new incarnation of the failed process is started and identified by $P_i$, t where (i) is the process number and (t) is the incarnation number, each state interval being identified by $(t,x)_i$ where (x) is the state interval number. A failure announcement is broadcast to the other processes, the announcement containing $(t,x)_i$ where (x) is the state interval number of the last recreatable state interval of the failed process incarnation $P_i$, t. Upon receiving a failure announcement containing $(t,x)_i$, the entry for process (i) is extracted from the local dependency vector. The entry for process (i) is compared to the $(t,x)_i$ contained in the failure announcement. The process is classified as orphaned from the comparison if the process depends upon a higher-index state interval than $(t,x)_i$. A process roll-back is performed to reconstruct only non-orphaned state intervals in the rolled-back process.

12 Claims, 19 Drawing Sheets

OTHER PUBLICATIONS

School of Computer Science, Carnegie Mellon Univ., (CMU–CS–96–181), Pittsburgh, PA. & ACM Computing Surveys; E.N. Elozahy et al.; pp. 1–46; "A Survey of Rollback–Recovery Protocols in Message–Passing Systems".

IEEE 24th Int'l Symposium on Fault–Tolerant Computing, Jun. 15–17, 1994; E. N. Elnozahy & W. Zwaenepoel; pp. 298–307; "On the Use and Implementation of Message Logging".

IEEE 25th Int'l Symposium on Fault–Tolerant Computing, Jun. 27–30, 1995; Y. Huang & Yi–Min Wang; pp. 459–463; "Why Optimistic Message Logging Has Not Been Used In Telecommunications Systems".

In Proceedings 12th Symposium on Reliable Distributed Systems, Oct. 6–8, 1993; David B. Johnson; pp. 86–95; "Efficient Transparent Optimistic Rollback Recovery for Distributed Application Programs".

J. of Algorithms, vol. 11, No. 3, Sep. 1990; D. B. Johnson & W. Zwaenepoel; pp. 462–491; "Recovery in Distributed Systems Using Optimistic Message Logging and Checkpointing".

Com. of the Assn. for Computing Machinery, vol. 21, No. 7, Jul. 1978; Leslie Lamport; pp. 558–565; "Time Clocks, and the Ordering of Events in a Distributed System".

IEEE Proc. 10th Symposium on Reliable Distributed Systems, Sep. 30 to Oct. 2, 1991; A. Lowry et al.; pp. 66–75; "Optimistic Failure Recovery for Very Large Networks".

Proc. of 8th Annual ACM Symposium on Principles of Distributed Computing, Aug. 14–16, 1989; A. P. Sistla & J. L. Welch; pp. 223–238; "Efficient Distributed Recovery Using Message Logging".

IEEE Proc. 25th Int'l Symposium on Fault–Tolerant Computing, Jun. 27–30, 1995; Sean W. Smith et al.; pp. 361–370; "Completely Asynchronous Optimistic Recovery with Minimal Rollbacks".

ACM Transactions on Computer Systems, vol. 3, No. 3, Aug. 1985; R. E. Strom and S. Yemini; pp. 204–226; "Optimistic Recovery in Distributed Systems".

IEEE Proc. 12th Symposium on Reliable Distributed Systems, Oct. 6–8, 1993; pp. 78–85; Yi–Min Wang & W. Kent Fuchs; "Lazy Checkpoint Coordination for Bounding Rollback Propagation".

FIG. 2

FAULT TOLERANT PROCESS LIST — 25

| PROCESS IDENTIFIER | IPC PORT NUMBER | PRIMARY NODE | BACKUP NODES | CURRENT EXECUTING NODE | CRITICAL FILES | TIME LIMIT |
|---|---|---|---|---|---|---|
| $P_0$ | PORT 0 | NODE 10 | NODE 12 | NODE 10 | CRITICAL MEMORY COPY-88 | 10 SECONDS |
| ... | ... | ... | ... | ... | ... | ... |
| $P_N$ | PORT N | NODE 10 | NODE 12 | NODE 10 | RECEIVER LOG FILE-90 | 18 SECONDS |
| $P_A$ | PORT A | NODE 12 | NODE 10 | NODE 12 | SENDER LOG FILE-92 | 4 SECONDS |
| 420 | 425 | 430 | 435 | 440 | 445 | 448 |

402, 404, 406, 408

RECEIVER MESSAGE LOG – $P_2$ — 90

| MESSAGE ID | MESSAGE SIZE | MESSAGE CONTENT | SENDER'S PROCESS ID | TRANSITIVE DEPENDENCE VECTOR |
|---|---|---|---|---|
| $M_a$ | 2 BYTES | OPEN FILE 1 | $P_3$ | $TDV_a$ |
| $M_b$ | 4 BYTES | WRITE FILE 1 | $P_1$ | $TDV_b$ |
| $M_c$ | 1 BYTES | CLOSE FILE 1 | $P_1$ | $TDV_c$ |

502 — $M_a$ row; 504 — $M_b$ row; 506 — $M_c$ row
520, 522, 524, 526, 528

DISTRIBUTED RECOVERY WITH κ-OPTIMISTIC LOGGING

RELATED APPLICATIONS

This application is a continuation of application Ser. No. 08/863,065, filed May 23, 1997.

BACKGROUND OF INVENTION

(1) Field of Invention

This invention relates to fault-tolerant systems and methods. More particularly, the invention relates to fault-tolerant systems and methods using optimistic logging with a synchronous recovery in message passing systems.

(2) Description of Prior Art

Log-based rollback-recovery is an effective technique for providing low-cost fault tolerance to distributed applications. See Appendix I, [1, 3, 12, 7, 4]. It is based on the following piecewise deterministic (PWD) execution model [12]: process execution is divided into a sequence of state intervals each of which is started by a non-deterministic event such as message receipt. For simplicity it is assumed that message-delivering events are the only source of non-determinism in this invention. The execution within an interval is completely deterministic. During normal execution, each process periodically saves its state on stable storage as a checkpoint. The contents and processing orders of the received messages are also saved on stable storage as message logs. Upon a failure, the failed process restores a checkpointed state and replays logged messages in their original order to deterministically reconstruct its pre-failure states. Log-based rollback-recovery is especially useful for distributed applications that frequently interact with the outside world [4]. It can be used either to reduce the amount of lost work due to failures in long-running scientific applications [4], or to enable fast and localized recovery in continuously-running service-providing applications [5].

Depending on when received messages are logged, log-based rollback-recovery techniques can be divided into two categories: pessimistic logging [1, 5] and optimistic logging [12]. Pessimistic logging either synchronously logs each message upon receiving it, or logs all delivered messages before sending a message. It guarantees that any process state from which a message is sent is always recreatable, and therefore no process failure will ever revoke any message to force its receiver to also roll back. This advantage of localized recovery comes at the expense of a higher failure-free overhead. In contrast, optimistic logging first saves messages in a volatile buffer and later writes several messages to stable storage in a single operation. It incurs a lower failure-free overhead due to the reduced number of stable storage operations and the asynchronous logging. The main disadvantage is that messages saved in the volatile buffer may be lost upon a failure, and the corresponding lost states may revoke messages and force other non-failed processes to roll back as well.

Although pessimistic logging and optimistic logging provide a tradeoff between failure-free overhead and recovery efficiency, it has traditionally been only a coarse-grain tradeoff; the application has to either tolerate the high overhead of pessimistic logging, or accept the inefficient recovery of optimistic logging. In practice, it is desirable to have a flexible scheme with tunable parameters so that each application can fine tune the above tradeoff based on the load and failure rate of the system. For example, a telecommunications system needs to choose a parameter to control the overhead so that it can be responsive during normal operation, and also control the rollback scope so that it can recover reasonably fast upon a failure.

SUMMARY OF INVENTION

A fault-tolerant message-passing system and method uses an optimistic logging protocol with asynchronous recovery wherein an integer K represents the degree of optimism which can be associated with each message to fine-tune a trade-off between failure-free overhead and recovery efficiency. The system comprises a plurality of interconnected processors, each processor including storage, volatile and non-volatile, and a watchdog process for detecting process and processor failures. Each process comprises a sequence of state intervals. During failure-free execution, each process establishes checkpoints by saving in storage the state of the process sufficient to re-start execution of the process. Each process also logs non-deterministic events in storage so that they can be replayed after process restart to reconstruct more pre-failure state intervals. Periodically, a process broadcasts a logging progress notification to let other processes know which of its state intervals have become stable in which the state interval is recreatable from information saved in stable storage. Each process also performs transitive dependency tracking in order to record the highest-index state interval of each process upon which the local process depends. A process does so by attaching a variable-size vector to each outgoing message, and updating its local vector upon receiving each incoming message. An integer K (where K is between O and N, and N is the total number of processes) is assigned to each outgoing message as the upper bound on the vector size. Vector entries corresponding to state intervals that have become stable are omitted, and so K in fact indicates the maximum number of processes whose failure may revoke the message. A message is sent only after its remaining vector size is less than or equal to K. When the watchdog process detects a process failure, the failed process is restarted. The restarted process restores the latest checkpoint, replays the logged messages that follow, starts a new incarnation, and broadcasts a failure announcement. Each process incarnation is identified by $P_i$, t where (i) is the process number and (t) is the incarnation number. Each state interval is identified by $(t,x)_i$ where (x) is the state interval number. Each failure announcement contains $(t,x)_i$ where (x) is the state interval number of the last recreatable state interval of the failed process incarnation $P_i$, t. Upon receiving a failure announcement containing $(t,x)_i$, each process extracts from its local dependency vector the entry for process (i) and compares it against $(t,x)_i$. If the comparison shows that the process depends on a higher-index state interval than $(t,x)_i$, the process is deemed orphaned and is then rolled back to reconstruct only non-orphaned state intervals. Rolled-back non-failed processes do not broadcast rollback announcements.

DESCRIPTION OF DRAWINGS

FIG. 2 illustrates a fault tolerant process list that maintains current information for each monitored application process that is executing in the fault tolerant message passing system of FIG. 1.

DESCRIPTION OF PREFERRED EMBODIMENT

The concept of K-optimistic logging where K is an integer between O and N (the total number of processes) shall be described. Given any message m in a K-optimistic logging system, K is the maximum number of processes whose failures can revoke m. Clearly, pessimistic logging corresponds to O-optimistic logging because messages can never be revoked by any process failures, while traditional optimistic logging corresponds to N-optimistic logins because, in the worst case, any process failure can revoke a given message. Between these two extremes, the integer K then serves as a tunable parameter that provides a fine-grain tradeoff between failure-free overhead and recovery efficiency.

We consider K-optimistic logging in distributed applications consisting of N processes communicating only through messages. The execution of each process satisfies the piecewise deterministic (PWD) model. A rollback-recovery layer is implemented underneath the application layer to perform checkpointing, message logging, dependency tracking, output commit, etc. During failure-free execution, each process takes independent or coordinated checkpoints [4], and employs additional optimistic logging. When a checkpoint is taken, all messages in the volatile buffer are also written to stable storage at the same time so that stable state intervals are always continuous. Upon a failure, non-stable state intervals are lost and cannot be reconstructed. Messages sent from those lost intervals become orphan messages. Any process states and messages which casually depend on any such message also become orphan states and orphan messages, respectively. Correct recovery then involves rolling back orphan states and rejecting orphan messages to bring the system back to a globally consistent state. We do not address the problem of lost in-transit messages [3]. They either do not cause inconsistency, or they can be retrieved from the sender's volatile log [12].

Now turning to FIG. 1, a fault tolerant message passing system 5 will now be described using a system architecture similar to that shown and described in U.S. Pat. No. 5,530,802, issued Jun. 25, 1996, assigned to the same assignee as that of the present application, and fully incorporated herein by reference.

Figure 1:
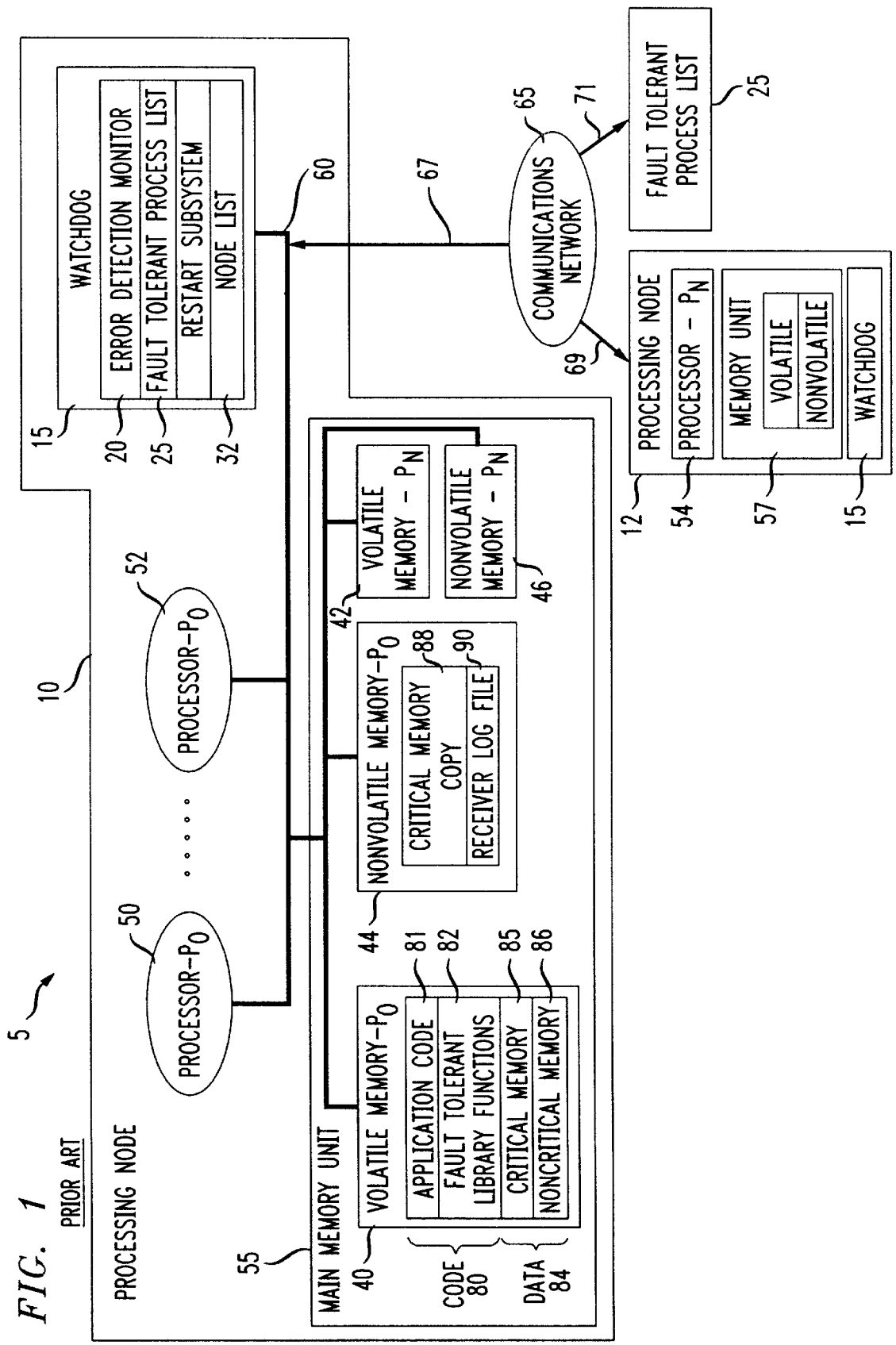
FIG. 1 is a schematic block diagram illustrating a fault tolerant system according to the present invention.

In FIG. 1, the fault-tolerant system 5 provides facilities for monitoring one or more application processors which may communicate by means of a message-passing mechanism. The system 5 will detect faults in an application process which causes the application process to crash or hang. Thereafter, the fault-tolerant system 5 will initiate a recovery of the application process. The system may be implemented in an environment consisting of a single node executing one or more processes, or, alternatively, in an environment consisting of a plurality of interconnecting nodes, each executing one or more processors.

As shown in FIG. 1, a preferred embodiment of the fault-tolerant system 5 includes a plurality of processing nodes, such as nodes 10 and 12. Alternatively, the fault-tolerant system 5 may consist of a single node having a single processing unit that is capable of executing a plurality of concurrent processes by implementing a time-sharing mechanism, in a known manner.

Each node, such as the nodes 10 and 12, may be embodied as a work station or other general purpose computing device which consists of at least one processing unit, such as the processing units 50, 52 and 54, and a memory unit such as the memory units 55 and 57. Alternatively, one or more of the processing nodes, such as the nodes 10 and 12, may be embodied in a dedicated program control processor, such as a telecommunications switch.

In one embodiment, one or more nodes in the fault-tolerant system 5, such as node 10 are embodied as parallel processing units, such as a parallel processing work station, capable of executing a plurality of concurrent processors. Each processing unit 50, 52, 54 executes a concurrent process, such as the processes P0 through Pn and Pa. If a node, such as a node 10, includes a plurality of processors, such as processors 50 and 52, each processor can have its own dedicated memory unit, or can share a common memory unit 55 with other processors on the same node, as shown in FIG. 1. The memory unit 55 of each node, such as the nodes 10 and 12, typically include areas of volatile memory 40, 42 and non-volatile memory 44, 46. In the preferred embodiment, each process will have separately allocated areas of volatile and non-volatile memory in the memory unit 55, such as memory areas 40 and 44 for the process P0 as shown in FIG. 1. As is well known, volatile memory is an area of unstable memory that is unable to retain information without continuous power.

The volatile memory 40 associated with each process will preferably include a section 80 for storing the software code associated with the respective application process. The code section 80 associated with a given application process will typically include application code 81 and fault-tolerant library functions 82 invoked by the application code. The fault-tolerant library functions 82, are user-level library functions written in a high level programming language, such as C-program language. The application code which invokes routines to the fault-tolerant library 82 are bound together with invoked functions during compilation.

In addition, the volatile memory area 40 associated with each process will include a data section 84 for storing the data associated with respective application processes. The fault-tolerant library 82 includes a critical memory function which allows the user to specify that certain data associated with an application processes critical data, which will preferably be stored by the fault-tolerant system 5 in a area of critical memory. Data in the application process that is not specified by the user to be critical will be stored in an area of non-critical memory 86.

Figure 5A:
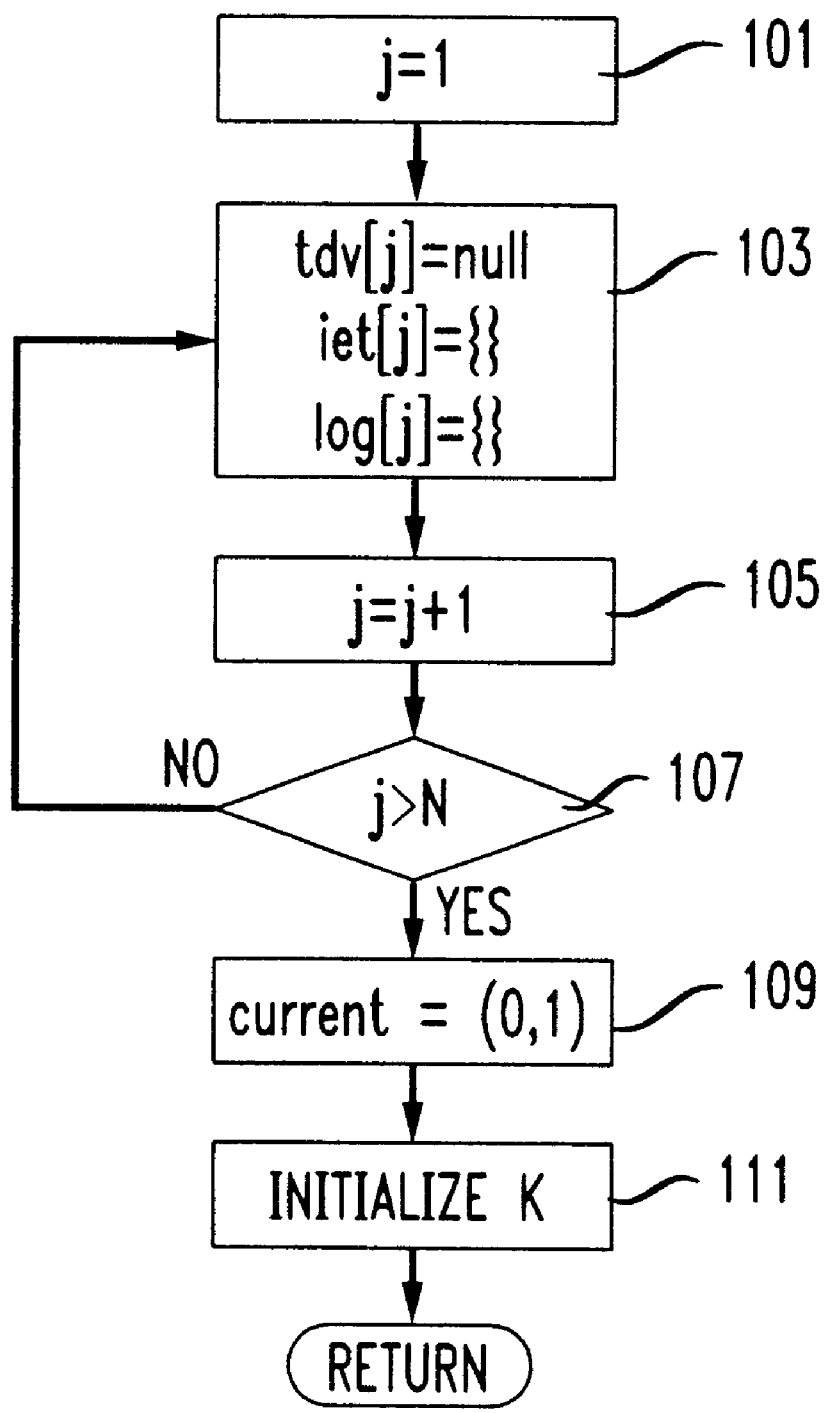
FIGS. 5A–5S are flow charts illustrating a process of optimistic logging with asynchronous recovery in the fault tolerant messaging system of FIG. 1.
Figure 5B:
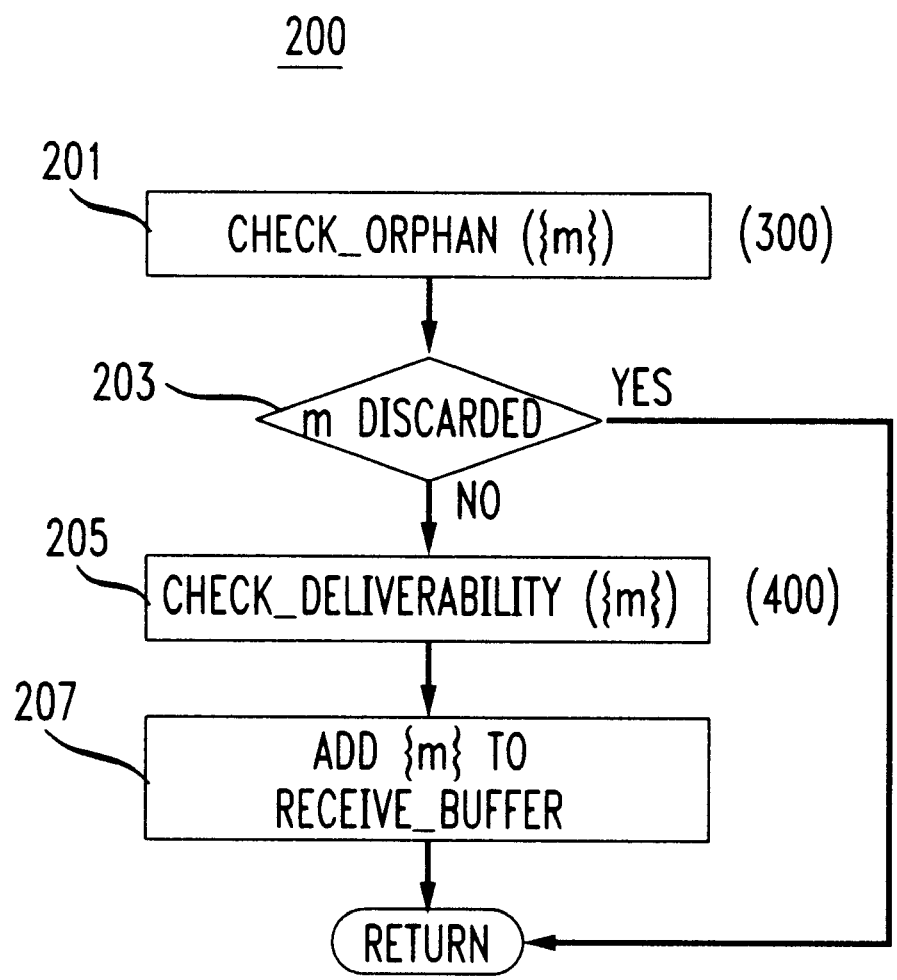
Figure 5C:
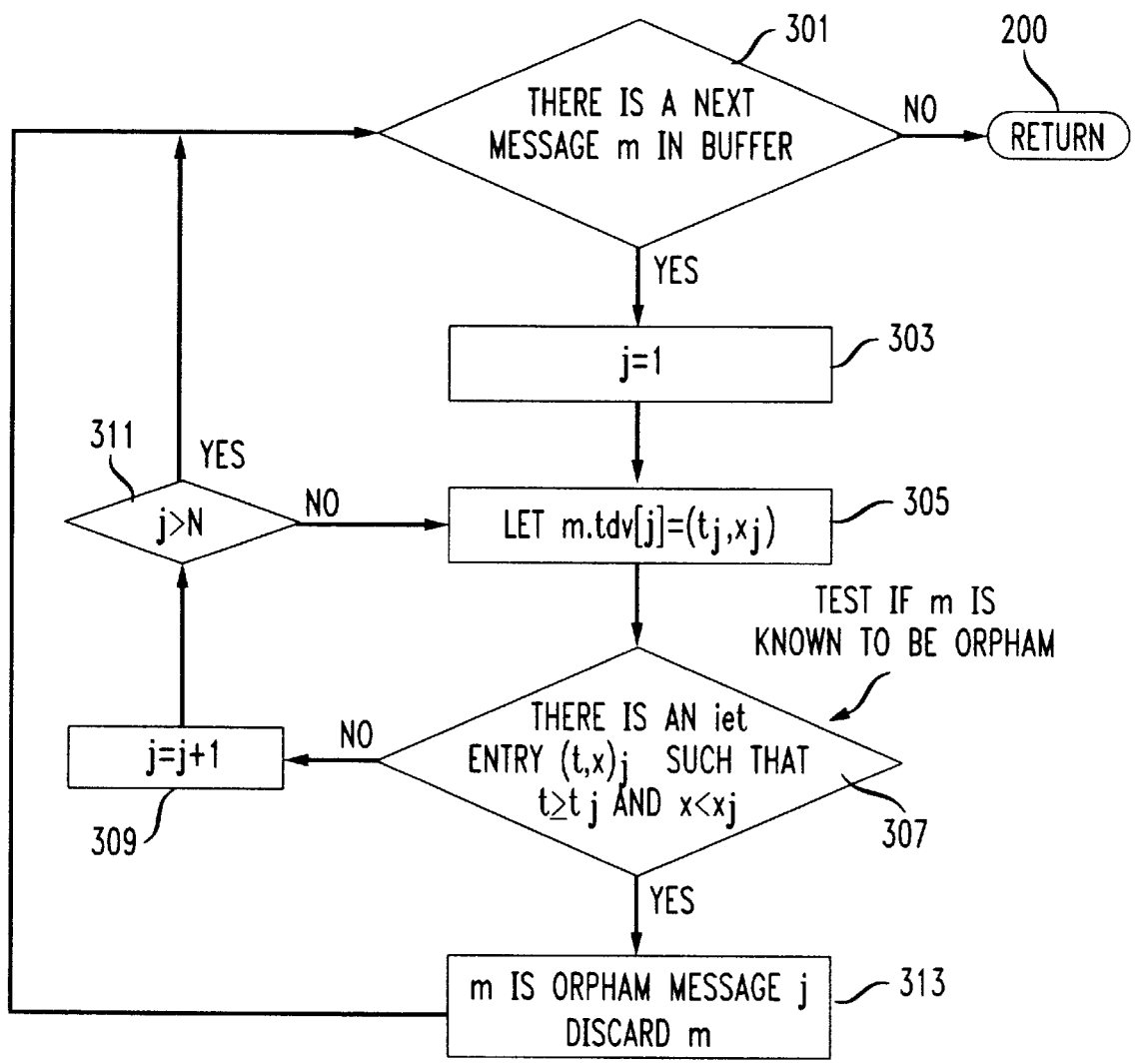
Figure 5D:
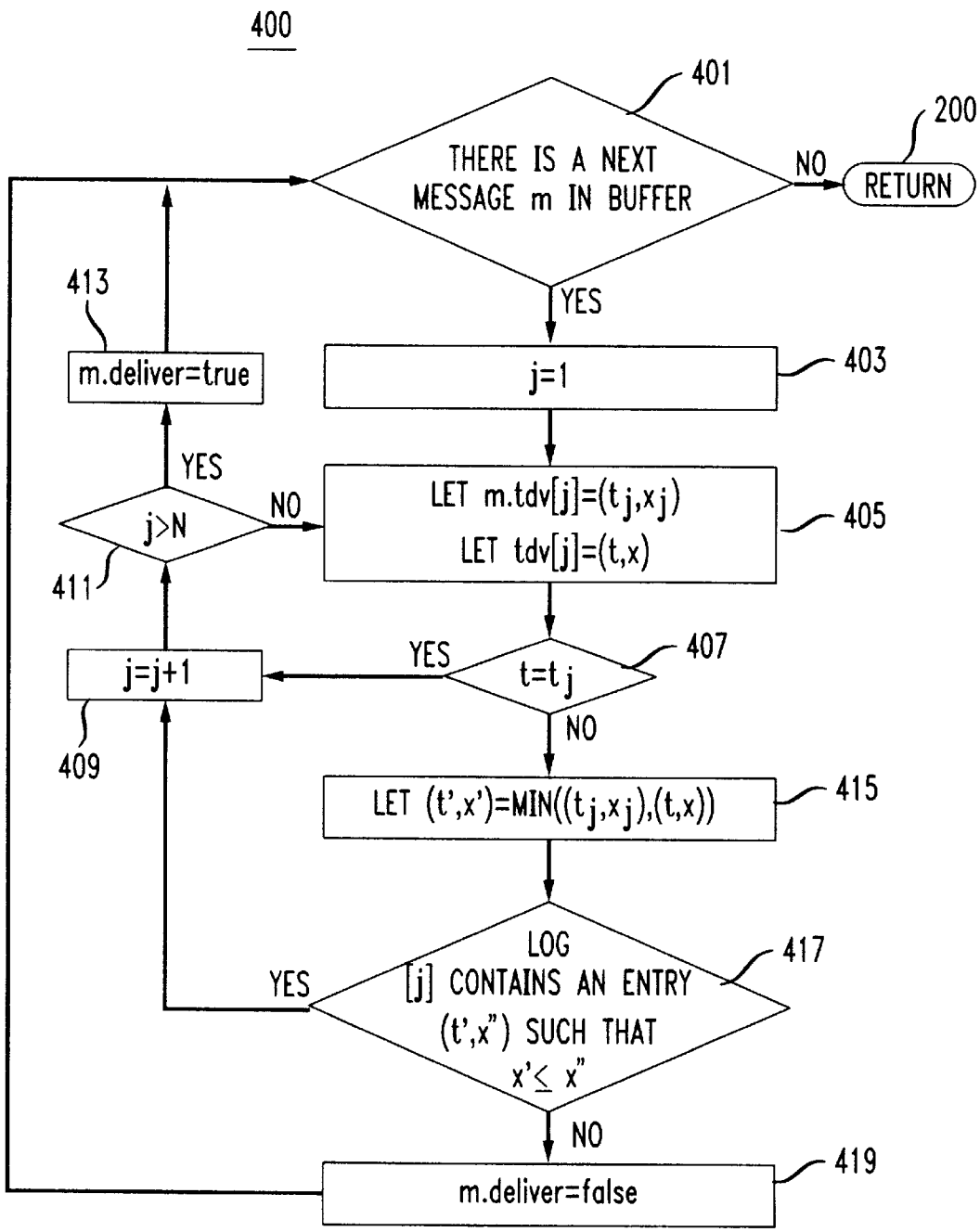
Figure 5E:
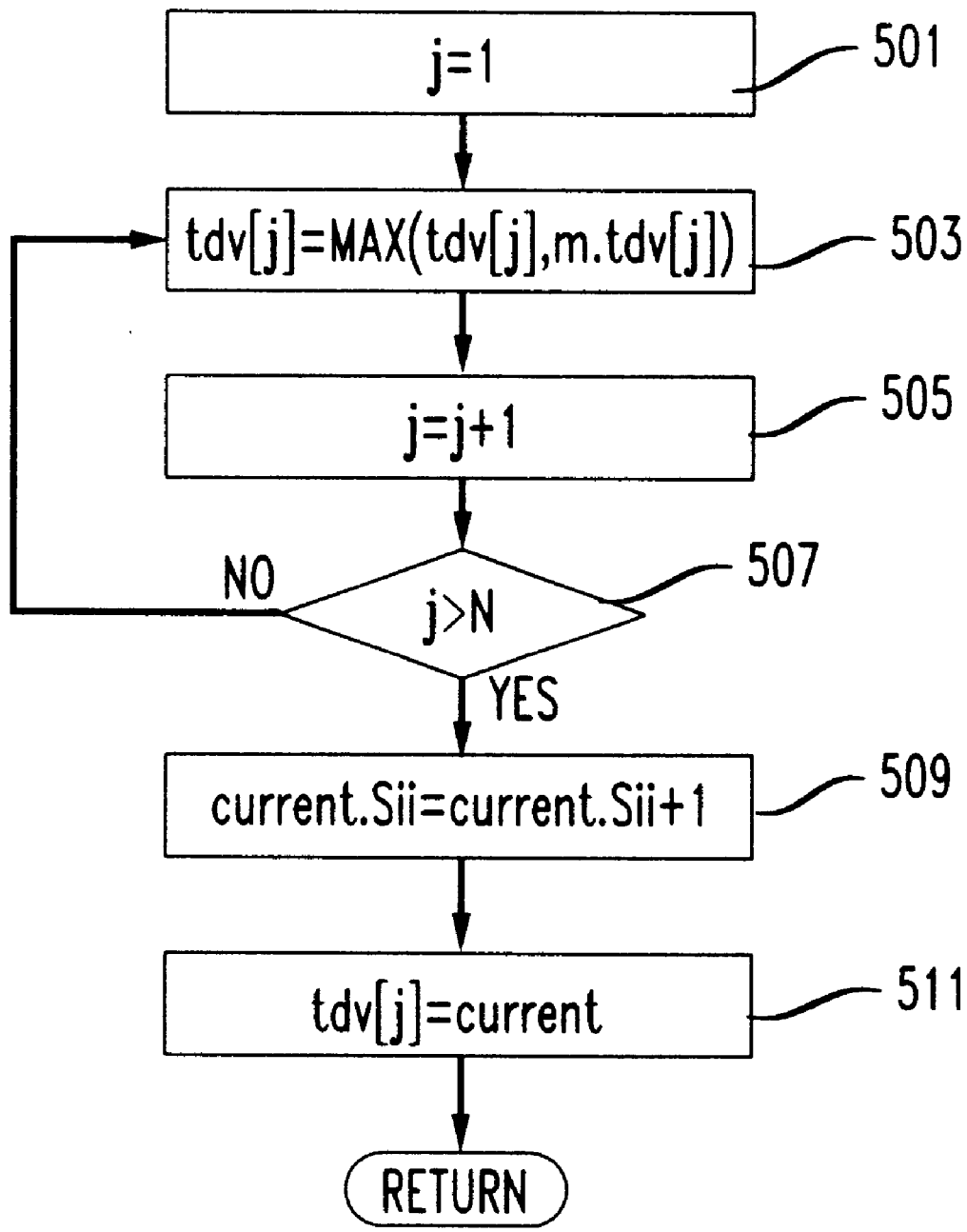
Figure 5F:
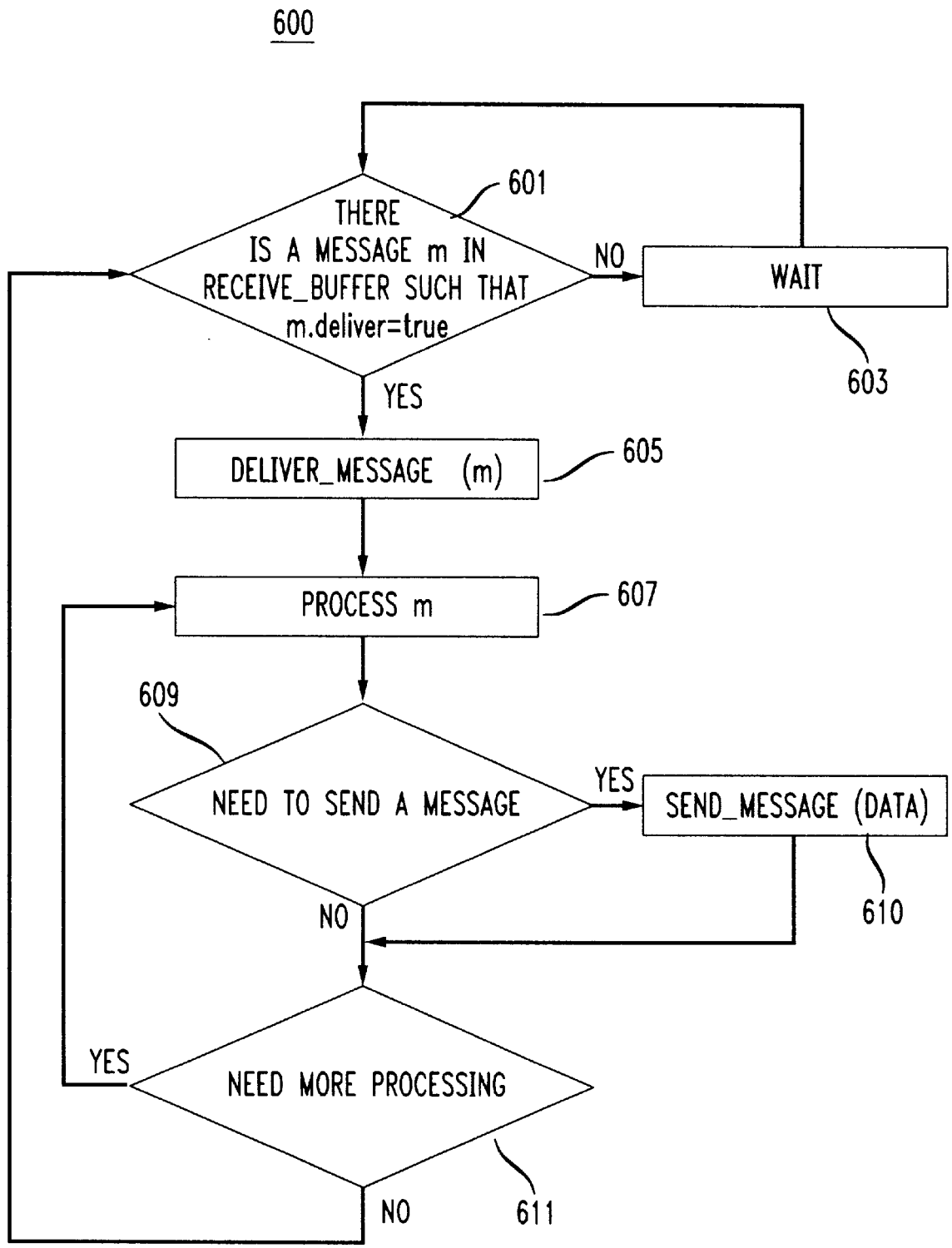
Figure 5G:
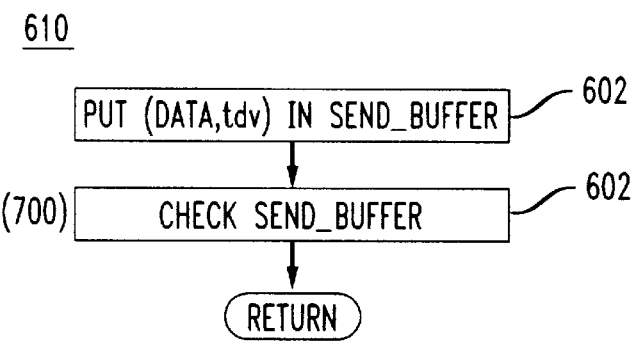
Figure 5H:
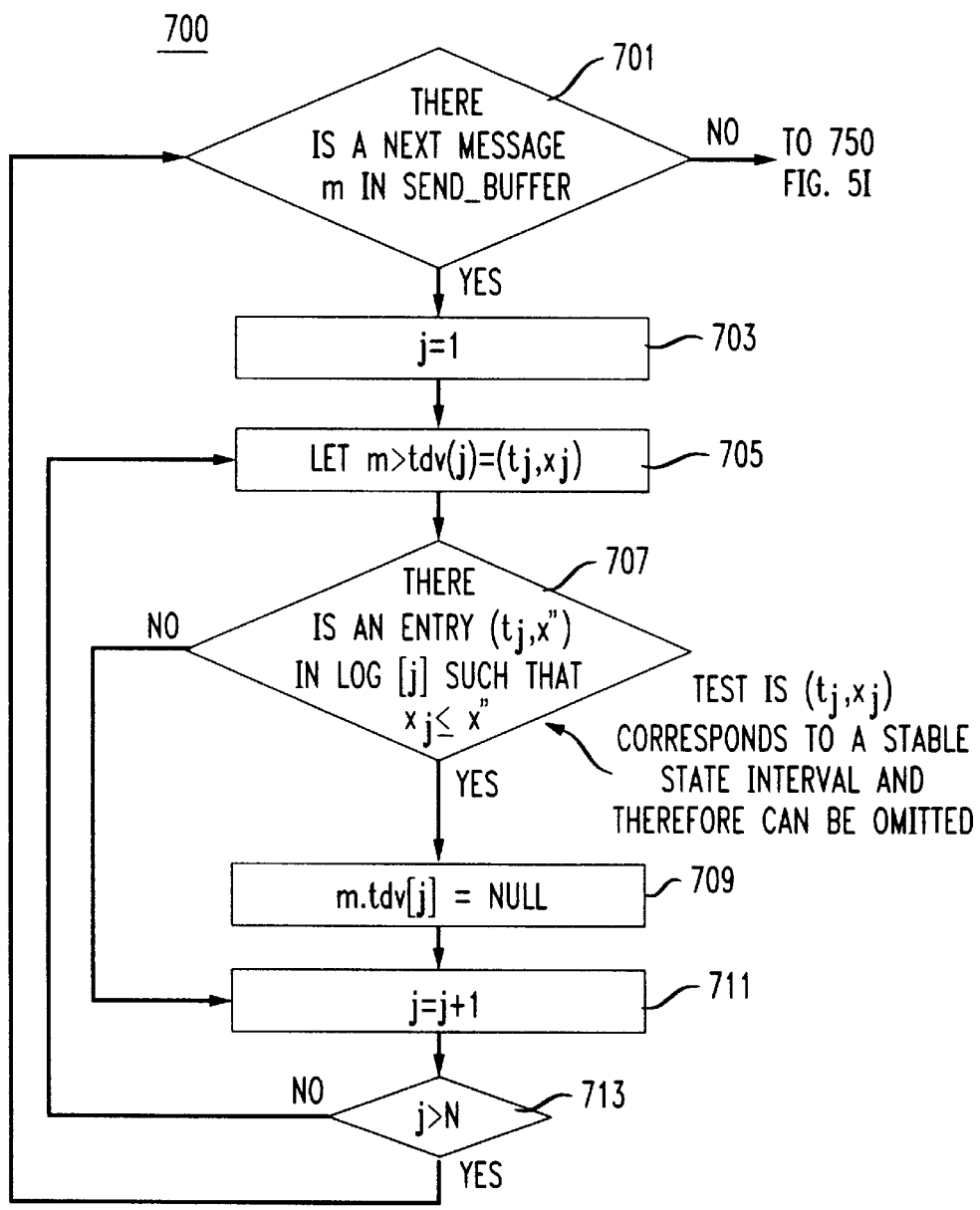
Figure 5I:
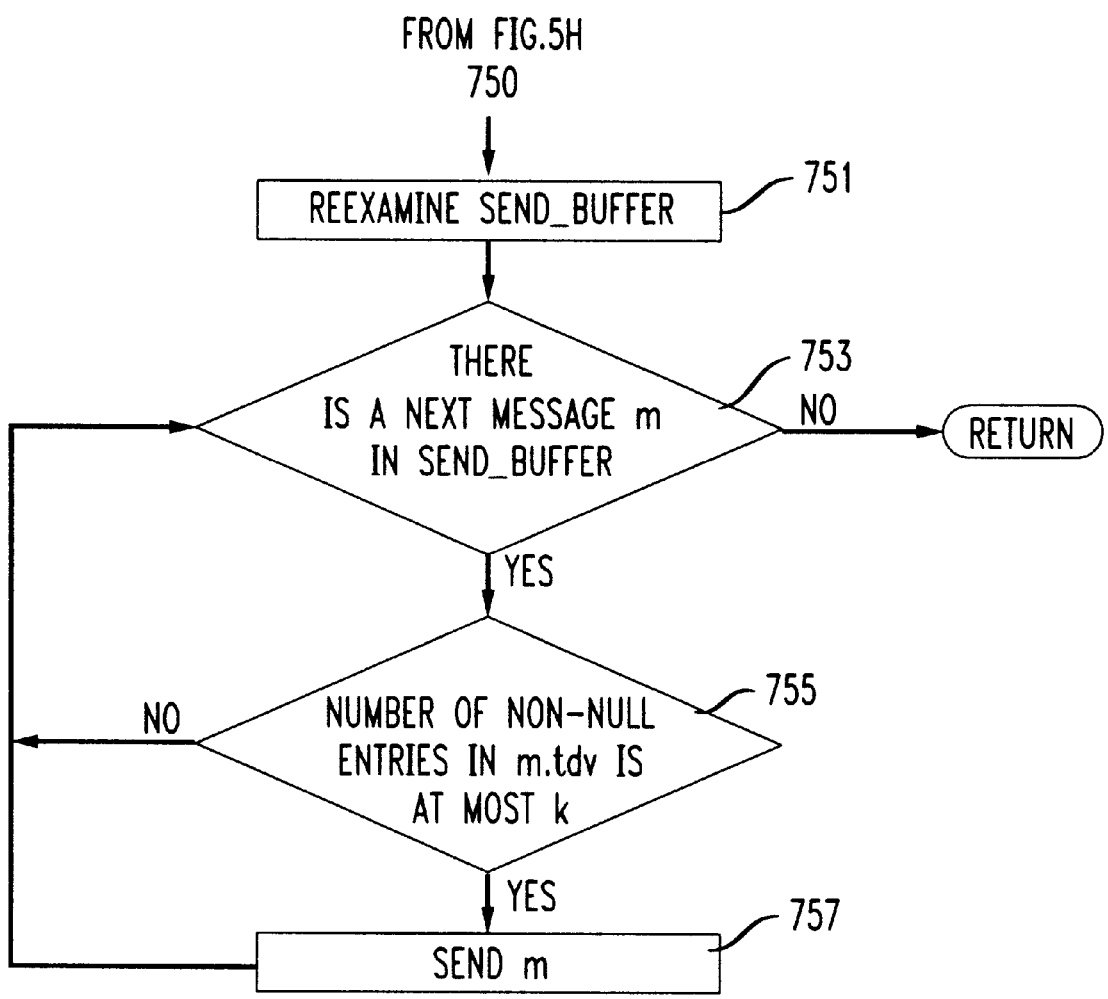
Figure 5J:
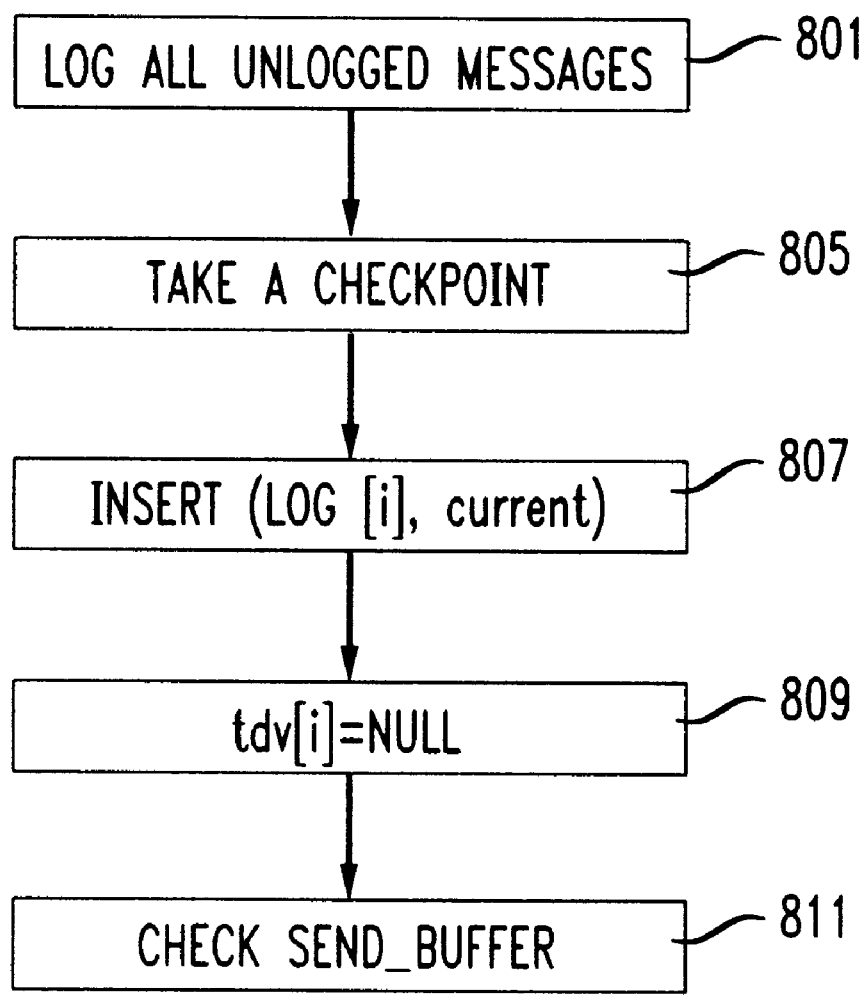
Figure 5K:
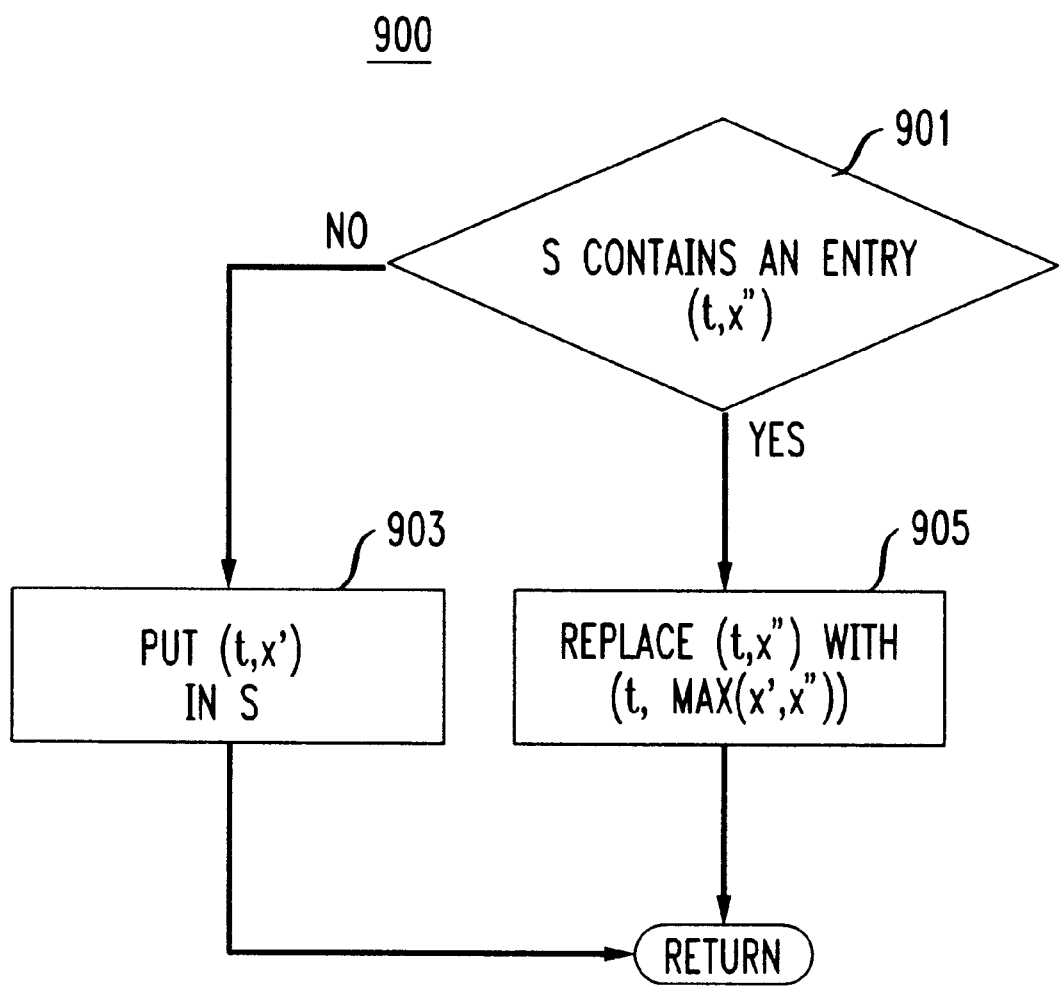
Figure 5L:
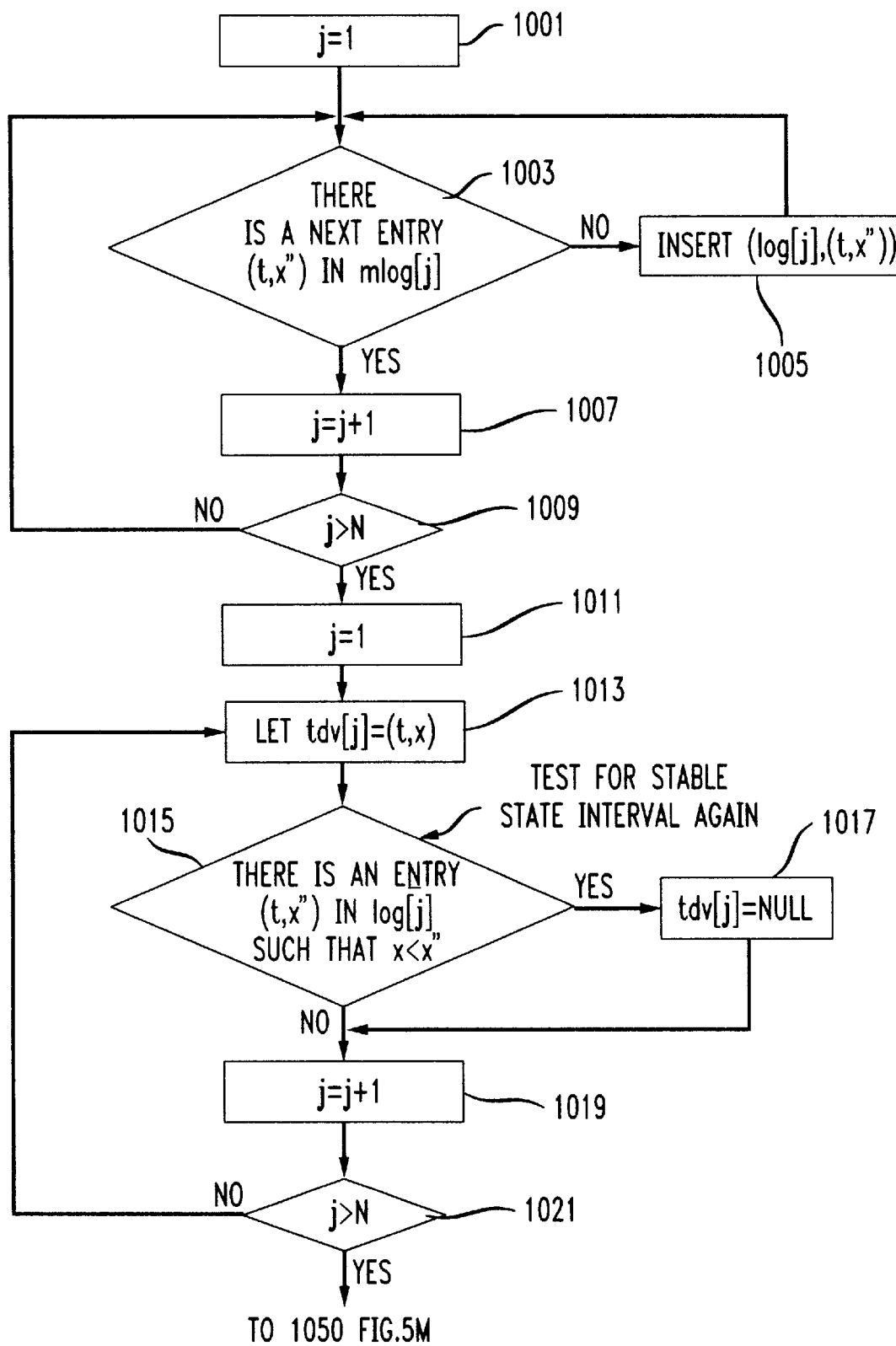
Figure 5M:
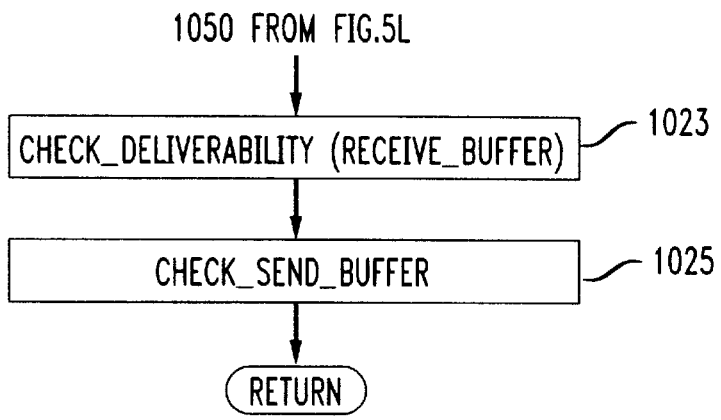
Figure 5N:
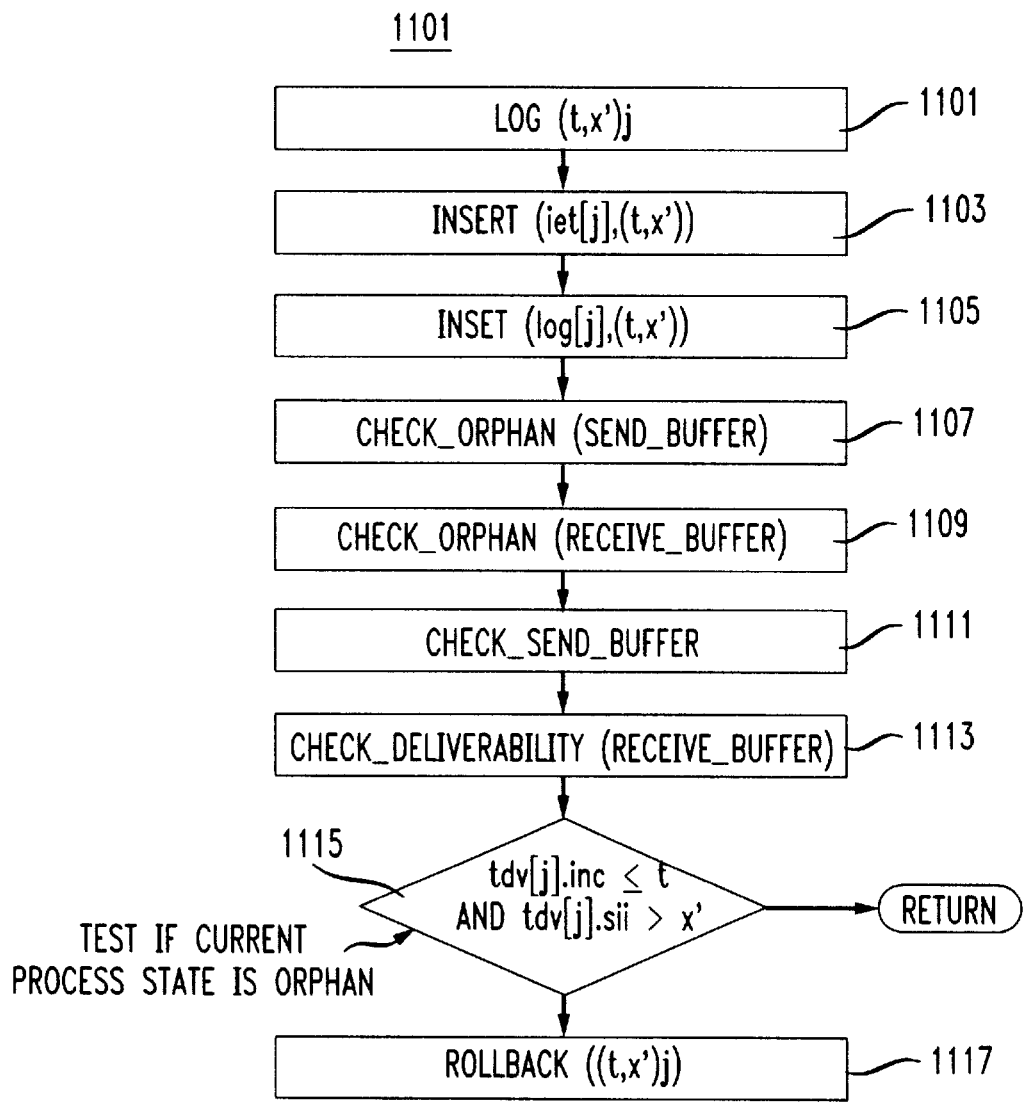
Figure 5O:
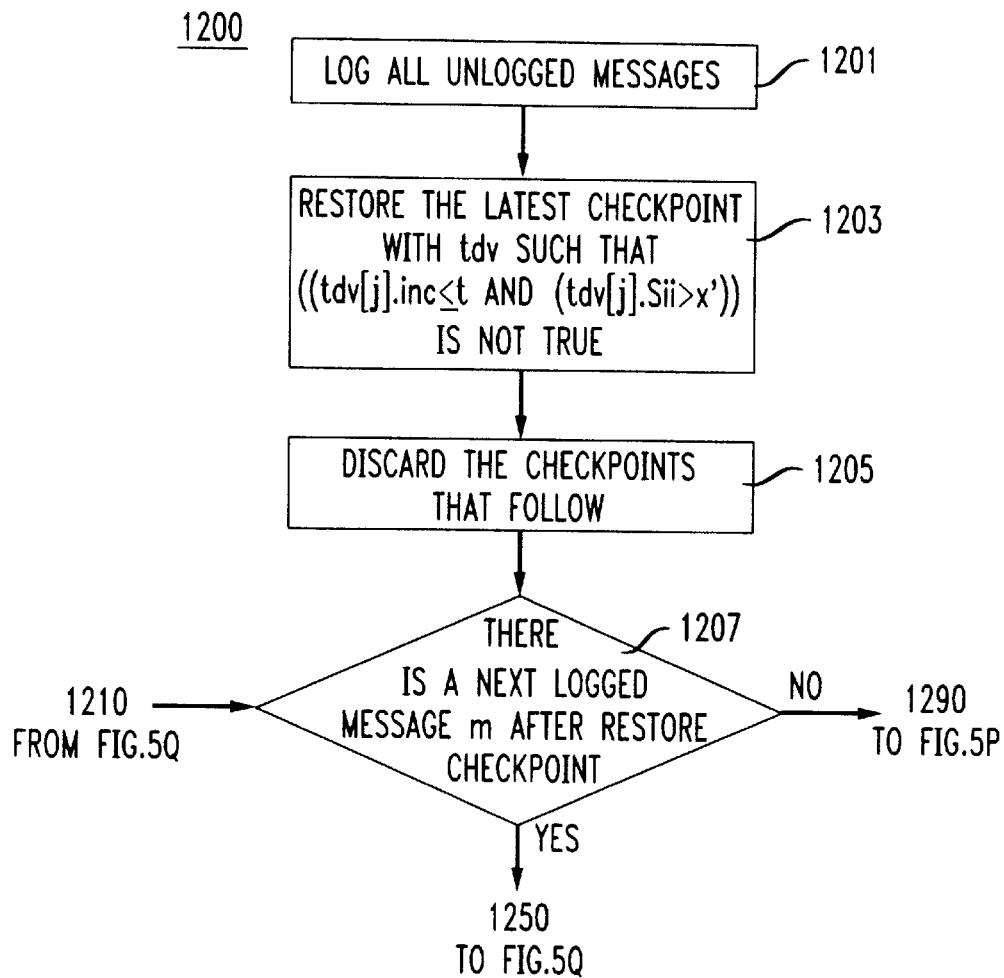
Figure 5P:
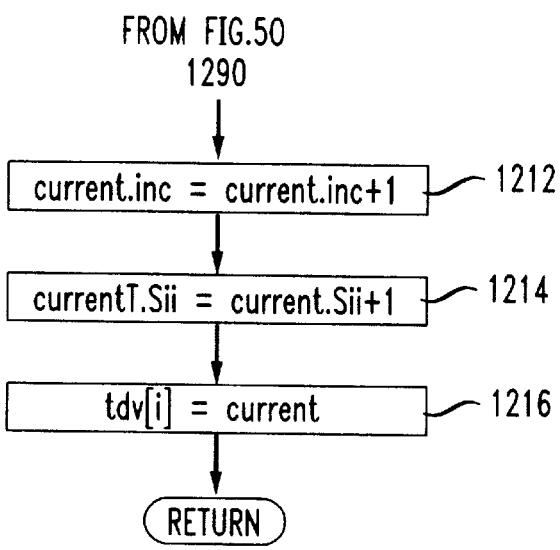
Figure 5Q:
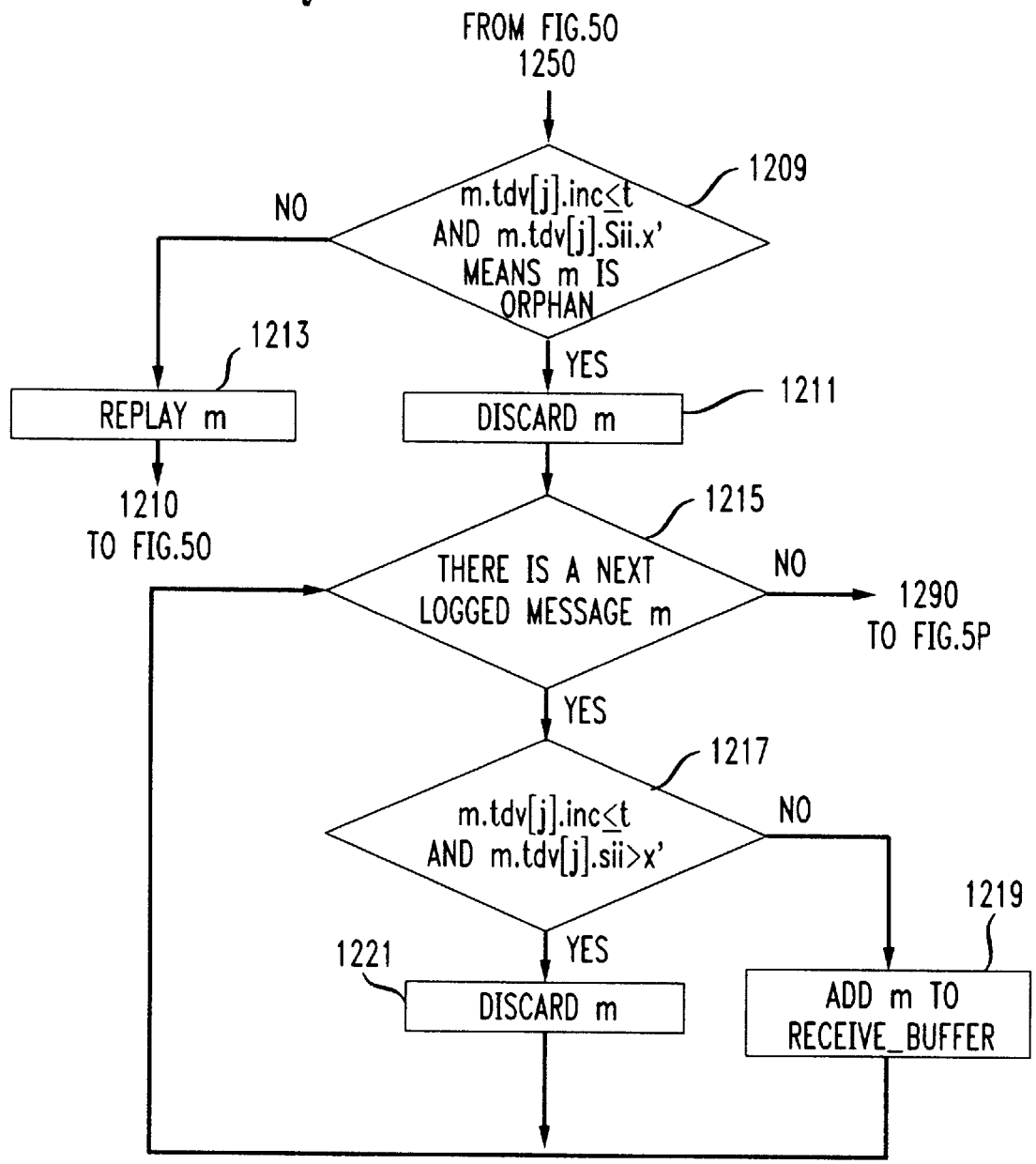
Figure 5R:
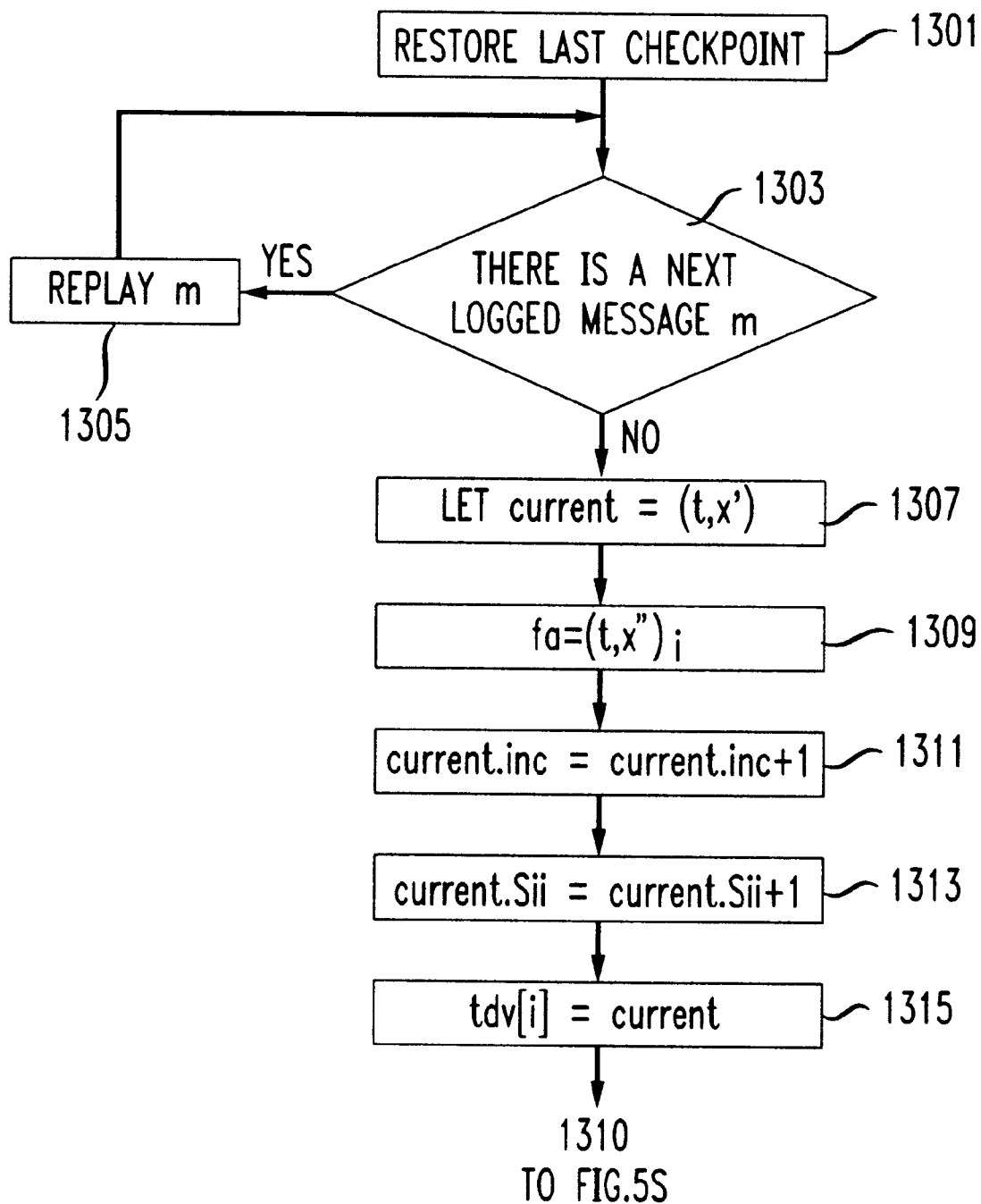
Figure 5S:
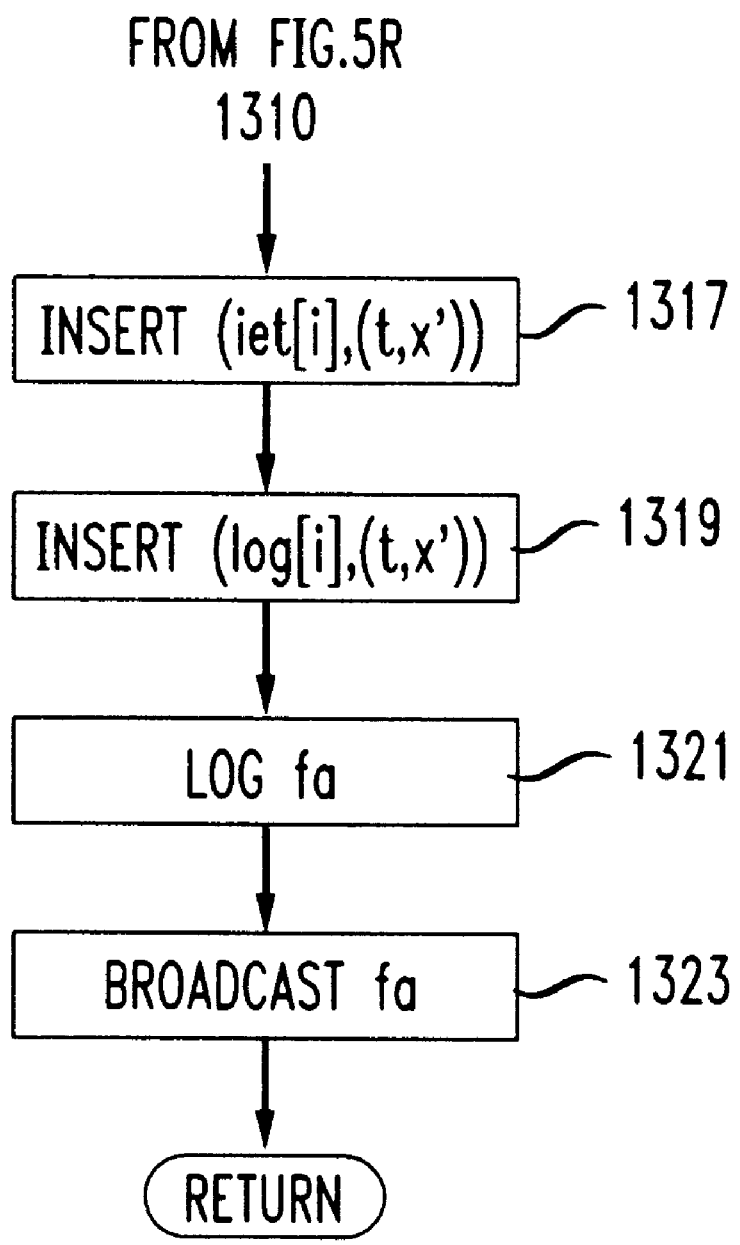

The non-volatile memory includes in a critical memory copy 88 an area for storing (a) logging progress parameters $(t,x)_i$ where (t) is an incarnation and (x) is a state interval number for a process (i), and (b) an area for storing an incarnation table listing all incarnations that are shown to have rolled back, as will be further described in conjunction with FIGS. 5A–5S.

The fault-tolerant library 82 includes a checkpoint function, which, when invoked by an application process, will store a copy of the critical data, as specified by the user, from the volatile memory in the area 88 of the non-volatile memory, which is a stable storage device which can retain information even in the absence of power. The non-volatile memory 44 may be a portion of the memory unit 55, or a remote file system. In a multiple node environment, the critical memory copy 88 will preferably be saved on backup nodes in addition to the primary nodes.

A message log is retained by the fault-tolerant system 5 for storing information on messages that are received by each process, such as the copy of the contents of each message and information on the order in which each message was processed by the application process.

Upon detection of a fault in an application process, a log-based recovery may be implemented using the present invention by restarting the faulty process from the latest check point stored in the critical memory copy 88 and then replaying messages from the message logs that were received since the latest checkpoint to reconstruct as much process state as possible.

The processing unit 50, 52 and the memory unit 55 of an individual node, such as the node 10 are interconnected by a bus 60, or Inter-Process Communication (IPC) facilities on the local node for inter-node communication in a known manner. In addition, each node 10, 12 may be interconnected with other nodes including a fault-tolerant process list via communications network 65 and data links 67–71 in a known manner for inter-node communication.

As shown in FIG. 1, each node, such as the node 10 will have a watchdog 15 which includes an error detection monitor 20 for monitoring the processes that are executing on a respective node. The watchdog 15 will maintain a fault-tolerant process list 25 which lists those processes executing on a respective node 10 which should be monitored by the watchdog.

The error detection monitor 20 of the watchdog 15 will continuously monitor each application process listed in the fault-tolerant process list 25, such as process P0, to determine whether a process is "hung" or "crash". The monitoring performed by the error detection monitor 20 may be either active or passive. In an active monitoring arrangement, the watchdog 15 may poll each monitored application process to determine its condition by periodically sending a message to the process using the IPC facilities on the local node 10 and evaluating the return value to determine whether that process is still active.

In a passive monitoring arrangement, each application includes a function of the fault-tolerant library 82 which will send a heartbeat message at specified intervals to the watchdog 15 indicating that the associated process is still active.

Now turning to FIG. 2, the fault-tolerant process list maintains information on those processes that are being monitored by the fault-tolerant system 5. In a preferred embodiment, an identical copy of the fault-tolerant process list is maintained by the watchdog 15 of each node. The fault-tolerant process list 25 maintains the plurality of rows such as rows 402, 404, 406, and 408, each associated with a monitored application process. For each application process listed in column 420, the fault-tolerant process list 25 includes an indication in column 425 of the IPC port of the local node that should be utilized to communicate with the process.

Fault-tolerant process list 25 will include in column 445 an indication that critical files, such as the critical memory copy 88 and the receiver log file 90 associated with each process. Finally, the fault-tolerant process list 25 may optionally include a time limit in column 448 which, in the passive error detection monitoring arrangement, is the maximum time that the watchdog 15 should wait between heartbeat messages before concluding that the application process is "hung".

Figures 3, 4:
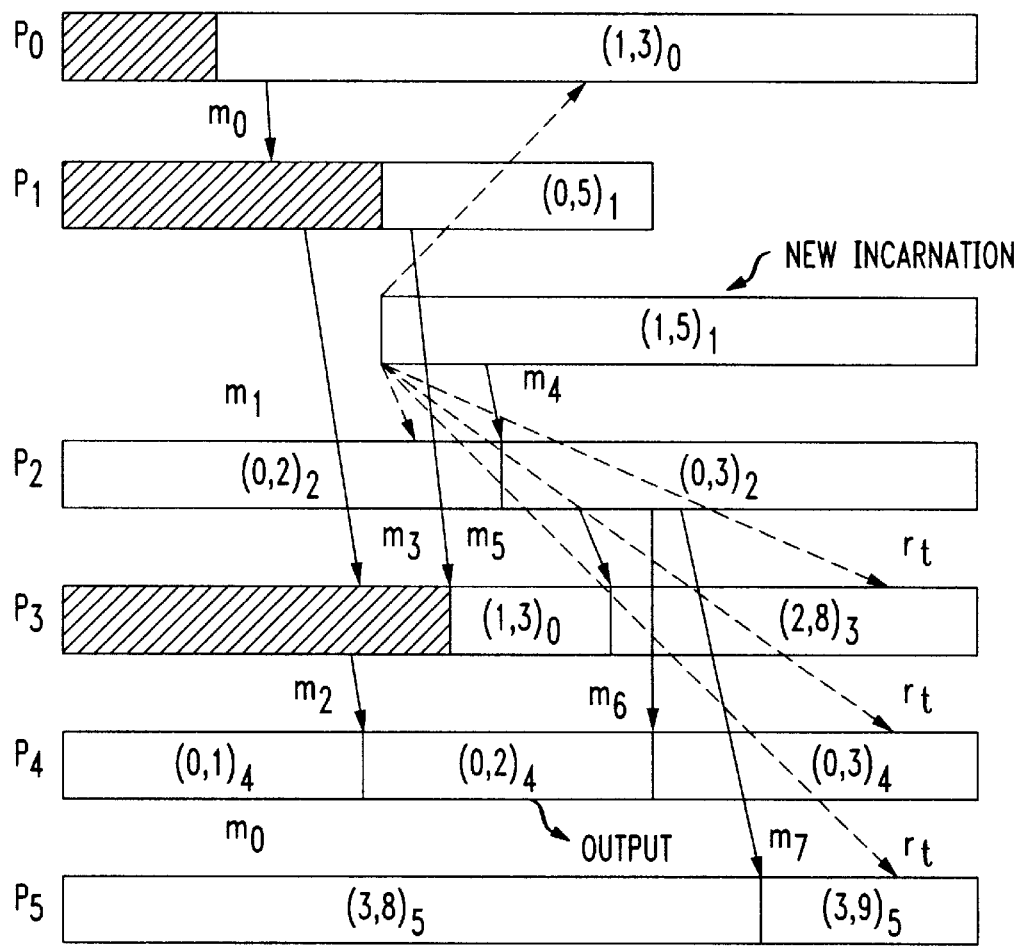
FIG. 3 illustrates a receiver log that maintains information on each of the messages that are received by an associated application process.
FIG. 4 illustrates a communication pattern for a plurality of concurrent application processes and how the processes are affected by the failure of a process in the message passing system of FIG. 1.

As previously indicated, each message that is received by an application process is preferably logged in a receiver log file shown in FIG. 3. The log file is preferably maintained for each process monitored by the fault-tolerant system 5 in order to store information for each message received by the associated process.

The receiver log file 90 maintains a plurality of rows, such as rows 502, 504 and 506, each associated with a message received by the associated process since the last successful checkpoint. For each received message listed in column 520, the receiver log 90 includes an indication column 522 of the message size and an indication in columns 524 of the message content. It is noted that the message identification appearing in column 520 is for presentation purposes only.

In addition, the receiver log file 90 includes an indication in column 526 of the sender's process identifier, which may be assigned during system initialization by the watchdog 15. An indication in column 528 provides the transitive dependency vector associated with each message.

In a preferred embodiment, each time the associated process successfully executes a checkpoint, a "dummy" entry is preferably placed in the receiver log file. In this manner, messages in the receiver log file may be associated with the proper checkpoint interval number of the receiver in order that the messages received since the latest actual checkpoint can be identified during certain steps of a recovery algorithm to be described in conjunction with FIGS. 5A–5S.

Now turning to FIG. 4, we describe a completely asynchronous recovery protocol that piggybacks only dependency information. This protocol has the feature of completely decoupling dependency propagation from failure information propagation, and is useful for illustrating the basic concept of asynchronous recovery. A major disadvantage is that it allows potential orphan states to send messages, which may create more orphans and hence more rollbacks. To avoid this disadvantage, existing protocols couple dependency propagation with failure information propagation: the protocol by Strom and Yemini [12] delays the delivery of certain messages until receiving necessary failure information (to be described later); the protocol by Smith et al. [11] piggybacks failure information along with dependency information. We focus on Strom and Yemini's approach in this invention. In the next section, we prove a theorem on omitting redundant dependency tracking and describe how the result can be used to improve their protocol. The improved version then serves as the basis for K-optimistic logging.

We use the example in FIG. 4 to illustrate the major components of an asynchronous recovery protocol. Each rectangular box represents a state interval started by a message-delivering event. A shaded box indicates that the state interval is stable, i.e., can always be recreated from a checkpoint and message logs saved on stable storage. When a process rolls back, it starts a new incarnation [12] (or version [2]) (or version [2]), as illustrated by $P_1$'s execution. Each $(t, x)_i$, identifies the interval as the $x^{th}$ state interval of the $t^{th}$ incarnation of process $P_i$. We use $m_i$ to denote application messages (solid lines), and $r_i$ for rollback announcements that propagate failure information (dotted lines). "Rolling back to state interval u" means rolling back to a checkpoint and reconstructing the process state up to the end of u, while "rolling back state interval v" means the execution within v is undone.

We next describe four major components of the protocol.

Dependency tracking: With asynchronous recovery, message chains originating from multiple incarnations of the same process may coexist in the system (with or without FIFO assumption). Therefore, a process needs to track the highest-index interval of every incarnation, that its current state depends on. This can be maintained in the following way: a message sender always piggybacks its dependency information on each outgoing message. Upon delivering a message, the receiver adds the piggybacked dependency to its local dependency. If there are two entries for the same incarnation, only the one with the larger state interval index is retained. For example, when $P_4$ receives $m_2$, it records dependency associated with $(0, 2)_4$ as $\{(1,3)_0, (0,4)_1, (2,6)_3, (0,2)_4\}$. When it receives $m_6$, it updates the dependency to $\{(1,3)_0, (0,4)_1, (1,5)_1, (0,3)_2, (2,6)_3, (0,3)_4\}$.

Rollback announcements: When a process $P_j$ fails, it restores the most recent checkpoint and replays the logged messages that were processed after that checkpoint. Then $P_j$ increments its incarnation number and broadcast a rollback announcement (or recovery message [12]) containing the ending index number of the failed incarnation. Upon receiving a rollback announcement, a process $P_i$ compares its dependency with that index. If the dependency shows that $P_i$'s state depends on a higher-index interval of any failed incarnation of $P_j$, $P_i$ rolls back to undo the orphan states, and starts a new incarnation as if it itself has failed [12]. For example, suppose process $P_1$ in FIG. 1 fails at the point marked "X". It rolls back to $(0,4)_1$, increments the incarnation number to 1, and broadcasts announcement $r_1$ containing $(0,4)_1$. When $P_3$ receives $r_1$, it detects that the interval $(0,5)_1$ that its state depends on has been rolled back. Process $P_3$ then needs to roll back to $(2,6)_3$, and broadcast its own rollback announcement. In contrast, when $P_4$ receives $r_1$, it detects that its state does not depend on any rolled back intervals of $P_1$. In either case, $r_1$ is saved in an incarnation end table so that the process can reject messages from those rolled-back intervals, which may arrive later. Note that, after receiving $r_1$, $P_4$ may still need to remember its dependency on $(0,4)_1$ because a future failure of $P_0$ that rolls back $(1,3)_0$ may force $P_1$ to announce a new incarnation that invalidates $(0,4)_1$.

Logging Progress notification: Each process asynhronously saves messages in the volatile buffer to stable storage. Periodically, it broadcast a logging progress notification to let other processes know which of its state intervals has become stable. Such information is accumulated locally at each process to allow output commit and garbage collection [12]. For example, after $P_3$ makes the state intervals $(2,5)_3$ and $(2,6)_3$ stable, it can broadcast a notification to let others know that.

Output commit: Distributed applications often need to interact with the outside world. Examples include setting hardware switches, performing database updates, printing computation results, displaying execution progress, etc. Since the outside world in general does not have the capability of rolling back its state, the applications must guarantee that any output sent to the outside world will never need to be revoked. This is called the output commit problem. In a PWD execution, an output can be committed when the state intervals that it depends on have all become stable [12]. For example, $P_4$ in FIG. 4 can commit the output sent from $(0,2)_4$ after it makes $(0,2)_4$ stable and also receives logging progress notifications from $P_0$, $P_1$ and $P_3$, indicating that $(1,3)_0$, $(0,4)_1$ and $(2,6)_3$ have all become stable. An alternative is to perform output-driven logging by sending additional messages to force the logging progress at $P_0$, $P_1$ and $P_3$ [6].

We now establish a Theorem that tracking only dependencies on non-stable states is sufficient for the correct operation of any optimistic logging protocol employing transitive dependency tracking. We also demonstrate how the Theorem can be applied to reduce the size of dependency vectors. We use i, j, k for process numbers, t and s for incarnation numbers, and x and y for state interval indices.

The parameters u, v, w, x refer to state intervals, and $P_{v.p}$ refers to the process to which v belongs.

Lamport [8] defined the happen before relation for states. Similarly, Johnson and Zwaenepoel [7] defined the happen before relation (or transitive dependency relation [10] for state intervals. Let u<v if u and v are intervals of same process and u immediately precedes v. Let u→v if a message sent from interval u is delivered to start interval v. Transitive dependency (→) is defined as the transitive closure of the union of relations<and →. Given any two intervals u and v, if it is possible to determine whether v transitively depends on u (u→v) then the underlying system is said to be employing transitive dependency tracking. Now we can formally define orphan as follows.

DEFINITION 1 A state interval v is orphan if, ∃u: rolled back (u)∧(u→v).

Messages sent by orphan states are also called orphans. If the current state of a process is orphan then the process itself might be called orphan when there is no confusion.

Traditional asynchronous recovery protocols usually require every non-failed rolled-back process to behave as if it itself has failed [11,12] by starting a new incarnation and broadcasting a rollback announcement. It was recently observed that, under piecewise deterministic execution model, announcing only failures is sufficient for orphan detection [2]. We give a proof of this observation in Theorem 1, and carry the observation even further by proving, in Theorem 2, that any dependencies on stable intervals can be omitted without affecting the correctness of a recovery protocol which tracks dependencies transitively.

THEOREM 1 With transitive dependency tracking, announcing only failure (instead of all rollbacks) is sufficient for orphan detection.

Proof. Let a state interval v be orphan due to rollback of another interval u. Now interval u rolled back either because $P_{u.p}$ failed or because it became orphan due to the rollback of another interval z. By repeatedly applying the previous observation, we find an interval w whose rollback due to $P_{w.p}$'s failure caused v to become orphan. By definition of transitive dependency tracking, $P_{v.p}$ can detect that v transitively depends on w. Therefore, $P_{v.p}$ will detect that v is orphan when it receives the failure announcement from $P_{w.p}$.

We define that v is commit dependent on w if w→v and ¬stable (w). That is v is commit dependent on w if v is transitively dependent on w and w is not stable. A system is said to employ commit dependency tracking if it can detect the commit dependency between any two state intervals. The following theorem suggests a way to reduce dependency tracking for recovery purposes. It says that if all state intervals of $P_j$, on which $P_i$ is dependent, are stable then $P_i$ does not need to track its dependency on $P_j$.

THEOREM 2 Commit dependency tracking and failure announcements[4] are sufficient for orphan detection Proof. Once a state interval becomes stable, it can never be lost in a failure. It can always be reconstructed by restarting from its previous checkpoint and replaying the logged messages in the original order. Now following the proof in Theorem I, the orphan interval v transitively depends on interval w which was lost due to $P_{w.p}$'s failure. That must mean that w had not become stable when the failure occurred. By definition of commit dependency tracking, $P_{v.p}$ can detect that v transitively depends on w, and so it will detect that v is orphan when it receives the failure announcement from $P_{w.p}$.

Logging process notification is an explicit way to inform other processes of new stable state intervals. Such information can also be obtained in a less obvious way from two other sources. First, a rollback announcement, containing ending index $(t,x)_i$ can also serve as a logging progress notification that interval $(t,x')_i$ has become stable; Second, when process $P_i$ takes a checkpoint at state interval $(t, x)_i$, it can be viewed as $P_i$ receiving a logging progress notification from itself that interval $(t, x)_i$ has become stable. Since each process execution can be considered as starting with an initial checkpoint, the first state interval is always stable. Corollaries 1, 2 and 3 summarize these results.

COROLLARY 1 Upon receiving a rollback announcement containing ending index $(t, x)_i$, a process can omit the dependency entry $(t,x)_i$ if $x \leq x'$.

COROLLARY 2 Upon taking a checkpoint and saving all the messages in the volatile buffer to stable storage, a process can omit the dependency entry for its own current incarnations.

COROLLARY 3 Upon starting the execution, a process has no dependency entry.

As pointed out earlier, completely asynchronous recovery protocols that decouple dependency propagation from failure information propagation in general need to keep track of dependencies on all incarnations of all processes. Strom and Yemini [12] introduced the following coupling in their protocol to allow tracking dependency on only one incarnation of each process so that the size of dependency vector always remains N: when process $P_j$ receives a message m carrying a dependency entry $(t,x)_i$ before it receives the rollback announcement for $P_i$'s $(t-1)_{th}$ incarnation, $P_j$ should delay the delivery of m until that rollback announcement arrives. For example, in FIG. 4, $P_4$ should delay the delivery of $m_6$ until it receives $r_1$. After $P_4$ determines that its state has not become orphan, a lexicographical maximum operation [12] is applied to the two pairs $(0,4)$ and $(1,5)$ to update the entry to $(1,5)$. This update in fact implicitly applies Corollary 1: $r_1$ notifies $P_4$ that $(0,4)_1$ has become stable, and so the dependency on $(0,4)_1$ can be omitted. The entry can then be used to hold $(1,5)_1$.

We next describe three modifications to Strom and Yemini's protocol, based on Theorem 1, Theorem 2 and Corollary 1, respectively. The modified protocol then serves as the basis for K-optimistic logging.

Applying Theorem 1: Damani and Garg improved Strom and Yemini's protocol by applying Theorem 1 [2]. Since only failures are announced, the number of rollback announcements and the size of incarnation end tables are reduced. They did not increment the incarnation number on occurrence of non-failure rollback. In this invention, we also apply Theorem 1 but we still require each non-failed rolled-back process to increment its incarnation number. This is necessary for applying Theorem 2 because logging progress notification is on a per-incarnation basis.

Applying Theorem 2: Theorem 2 can be used to omit redundant dependency entries, thereby reducing the size of dependency vector to below N. For example, in FIG. 4, when $P_4$ receives $P_3$'s logging progress notification indicating that $(2,6)_3$ has become stable, it can remove $(2,6)_3$ from its dependency vector. If $(2,6)_3$ is later rolled back due to $P_0$'s failure, $P_4$'s orphan status can still be detected by comparing the entry $(1,3)_0$ against the failure announcement from $P_0$.

Applying Corollary 1: Strom and Yemini's protocol waits from the rollback announcement for $P_i$'s $(t-1)^{th}$ incarnation before acquiring a dependency on $P_i$'s $t^{th}$ incarnation. Corollary 1 can be used to eliminate unnecessary delays in message delivery. Suppose $P_j$ has a dependency on $(t-4, x)_i$ when it receives message m carrying a dependency on $(t,x+10)_i$. According to Theorem 2, $P_j$ only needs to be informed that interval $(t-4,x)_i$ has become stable before it can acquire the dependency on $(t,x+10)_i$ to overwrite $(t-4, x)_i$. Process $P_j$ can obtain that information when it receives either a logging progress notification or a failure announcement from $P_i$.

A more interesting and useful special case is when $P_j$ does not have any dependency entry for $P_i$ at all and so the delay is eliminated. For example, when $P_5$ in FIG. 4 achieves $m_7$ which carries a dependency on $(1, 5)1$, it can deliver $m_7$ without waiting for $r_1$ because it has no existing dependency entry for $P_1$ to be overwritten.

As described above, traditional pessimistic logging and optimistic logging provide only a coarse-grain tradeoff between failure-free overhead and recovery efficiency. For long-running scientific applications, the primary performance measure is typically the total execution time. Since hardware failures are rare events in most systems, minimizing failure-free overhead is more important than improving recovery efficiency. Therefore, optimistic logging is usually a better choice. In contrast, for continuously-running service-providing applications, the primary performance measure is typically the service quality. Systems running such applications are often designed with extra capacity which can absorb reasonable overhead without causing noticeable service degradation. On the other hand, improving recovery efficiency to reduce service down time can greatly improve service quality. As a result, most commercial service-providing applications have chosen pessimistic logging [5].

The above coarse-grain tradeoff, however, may not provide optimal performance when the typical scenarios are no longer valid. For example, although hardware failures are rare, programs can also fail or exit due to transient software or protocol errors such as triggered boundary conditions, temporary resource on availability, and bypassable deadlocks. If an application may suffer from these additional failures in a particular execution environment, slow recovery due to optimistic logging may not be acceptable. Similarly, for a service-providing application, the initial design may be able to absorb higher run-time overhead incurred by message logging. However, as more service features are introduced in later releases, they consume more and more computation power and the system may no longer have the luxury to perform pessimistic logging.

These observations motivate the concept of K optimistic logging where K is the degree of optimism that can be tuned to provide a fine-grain tradeoff. The basic idea is to ask each message sender to control the maximum amount of "risk" placed on each outgoing message. Specifically, a sender can release a message only after it can guarantee that failures of at most K processes can possibly revoke the message (see Theorem 4).

A complete description of a K-optimistic logging protocol with asynchronous recovery will be described in conjunction with FIGS. 5A–5S and FIGS. 1, 2 and 3. The K-optimistic protocol is based on Strom and Yemini's protocol with the three improvements described in the previous section. Also, unlike Strom and Yemini's protocol, this protocol does not require FIFO ordering of messages. To simplify presentation by using vector notation and operations, the description always maintains a size-N dependency vector with entries of the form $(t,x)$. When an entry can be omitted, it is represented as setting the entry to NULL, which is lexicographically smaller than any non NULL entry. In an implementation of the protocol, NULL entries can be omitted and any non-NULL entry (t,x) for $P_i$ can be converted to the $(t,x)_i$ form, as used in the previous sections.

Before describing the details of FIGS. 5A–5S, an overview of the protocol (in Appendix II) is given to aid in an understanding thereof. The protocol describes the actions taken by a process $P_i$ upon the occurrence of different events. We explain in detail only those parts that are unique to our protocol. A complete explanation of the generic parts for optimistic logging and asynchronous recovery can be found in previous papers [2,12].

In the variable definition section, the integer K is the degree of optimism known to all processes at Initialize. According to Corollary 3, process $P_i$ sets all its dependency vector entries to NULL at Initialize, including the $i^{th}$ entry. At Check_deliverability, the scheme described at the end of commit dependency tracking is employed: if delivering a message to the application would cause $P_i$ to depend on two incarnations of any process, $P_i$ waits for the interval with the smaller incarnation number to become stable. Such information may arrive in the form of a logging progress notification or a failure announcement. When $P_i$ calls Send_message for message m, the message is held in a Send_buffer if the number of non-NULL entries in its dependency vector m.tdv is greater than K. The dependency vectors of messages in Send_buffer are updated in Check_send_buffer which is invoked by events that can announce new stable state intervals, including (1) Receive_log for receiving logging progress notification; (2) Receive_failure announcement (according to Corollary 1); and (3) Checkpoint (Corollary 2). When a message's dependency vector contains K or less non-NULL entries, it is released by Check_send_buffer. Process $P_i$ also needs to check and discard orphan messages in Send_buffer and Receive_buffer upon receiving a failure announcement, as shown in Receive_failure_announcement.

If a process needs to commit output to external world during its execution, it maintains an Output_buffer like the Send_buffer. This buffer is also updated whenever the Send_buffer is updated. An output is released when all of its dependency entries become NULL. It is interesting to note that an output can be viewed as a O-optimistic message, and that different values of K can in fact be applied to different messages in the same system.

We next prove two properties that are unique to the K-optimistic logging protocol.

THEOREM 3. The protocol implements commit dependency tracking.

Proof. Given any two state intervals w and v such that w→v and stable(w), we want to show that the dependency tracking scheme described in the protocol preserves the w→v information. Such information can be lost only when the dependency on w is set to NULL, which can happen only when a process receives a notification that w has become stable. Since w is not stable, the w→v information could not have been lost, and so the protocol implements commit dependency tracking.

THEOREM 4. Given any message in released by its sender, K is the maximum number of processes whose failures can revoke m.

Proof. In Check_send_buffer, the $j^{th}$ entry of the dependency vector of a message m is set to NULL when the corresponding interval in $P_j$ becomes stable. As per proof of Theorem 2, a failure of $P_j$ cannot cause m to become an orphan. Since m is released when the number of non-NULL entries becomes at most K, the result follows.

Now turning to FIGS. 5A–5S, the following definitions are used in the flow diagrams describing K optimistic logging with asynchronous recovery for the present invention:
a) data type entry: [incarnation number (t), state interval number (x)].
b) tdv: [current local dependency vector] array [1 . . . N] of entry.
c) log: [local log vector] array [1 . . . N] of set of entry.
d) iet: [incarnation end table] array [1 . . . N] of set of entry.
e) fa: [failure announcement] $(t, x)_i$.
f) current: [current index] entry
g) K: degree of optimism (assuming a single K for the entire system for simplicity)
h) m.tdv: [dependency vector of message (m)] array [1 . . . N] of entry.
i) mlog: [log vector received] array [1 . . . N] of set of entry.
Note: All routines are for process Pi Now turning to FIG. 5A, the parameters are initialized in a process 100. The process is entered in a step 101 in which the process number j is set to 1. A step 103 initializes and records in storage (i) the $j^{th}$ entry of the current local dependency vector (tdv) to be NULL; (ii) the $j^{th}$ entry of the incarnation end table (iet) to be an empty set; and (iii) the $j^{th}$ entry of the local log vector table (log) to be an empty set. In a step 105, j is incremented by one (1), followed by a test 107 to compare j to N, the total number of processes. A "no" condition returns the process to step 103 with the incremented j. A "yes" condition initiates a step 109 to set the current process index to (0, 1), that is, the first state interval of the $0^{th}$ incarnation. In a step 111, the variable K is set to a value between O and N, after which the process returns to the calling process $P_i$.

Process 200 in FIG. 5B is called by process $P_i$ when an incoming message arrives. The process is entered in a step 201 in which a check is made for orphan messages, as will be described in process 300. Afterwards, a test 203 is performed to determine if the message m has been discarded as an orphan message. A "yes" condition returns the process to $P_i$. A "no" condition, initiates a step 205 which checks the deliverability of the message m, as will be described in further detail in connection with process 400. A step 207 is performed to add the message m to the receive buffer regardless of the outcome of step 205, after which the process returns to $P_i$.

In FIG. 5C, a process 300 is performed to determine the is presence of orphan messages. A test 301 is performed to determine if there is a next message m in the buffer. A "no" condition returns the process to the calling process. A "yes" condition sets the parameter j to 1 in a step 303. In a step 305, suppose the $j^{th}$ entry of the message's dependency vector m.tdv is denoted by $(t_j, x_j)$. In a step 307, a test is made to determine if m is known to be an orphan. If there is an iet entry $(t, x)_j$ such that $t \geq t_j$ and $x < x_j$, a "yes" condition causes m to be discarded in a step 313 and the process returns to 301 to test the next message. A "no" condition indicates that the current test for the $j^{th}$ entry does not indicate that m is an orphan. So the next entry should be tested by incrementing j in a step 309. In a step 311, the new j is compared to N. A "yes" condition for j>N indicates that all entries have been tested, and none of them indicates that m is an orphan. So the process returns to step 301 to test the next message. A "no" condition returns the process to a step 305 to test the next entry.

In FIG. 5D, a process 400 checks on the deliverability of messages in buffer. The process is entered in a test 401 to determine if there is a next message m in the buffer. A "no"

condition indicates that all messages in the buffer has been checked, and the process returns to the calling process. A "yes" condition sets the process number j to 1 in a step 403. In a step 405, suppose the $j^{th}$ entry of m's dependency vector is denoted by $(t_j, x_j)$ and the $j^{th}$ entry of $P_i$'s local dependency vector is denoted by (t,x). A test 407 is performed to determine if t equals $t_j$. A "yes" condition indicates that the $j^{th}$ entry does not cause any deliverability problem, and so j is incremented in a step 409 and compared to N in a step 411. A "yes" condition indicates that none of the entries prevents the delivery of m, and so m.deliver is set to true in a step 413, and the process returns to step 401 to test the next message. A "no" condition for test 411 returns to step 405, in which the next entry is checked.

Returning to test 407, a "no" condition indicates a potential deliverability problem. In a step 415, suppose the minimum of $(t_j,x_j)$ and (t,x) is denoted by (t',x'). In a test 417, the $j^{th}$ entry of the local vector table is examined to determine if it contains an entry (t',x'') such that $x' \leq x''$. A "no" condition indicates that both entries $(t_j,x_j)$ and (t,x) cannot be omitted, and so m.deliver is set to false in step 419, after which the process returns to step 401 to test the next message. A "yes" condition indicates that the $j^{th}$ entry does not cause any deliverability problem, and so j is incremented in step 409 to get ready for the next entry.

In FIG. 5E, a process 500 is performed to deliver a message m. A step 501 sets the process number j to 1. A step 503 sets tdv[j] to be the maximum of tdv[j] and m.tdv[j]. A step 505 increments j and a test 507 compares j to N. A "no" condition to the test j>N returns the process to step 503 to update the next entry of the local dependency vector tdv. A "yes" condition finishes the updates, after which the state interval number of the current index is incremented in a step 509, and the $i^{th}$ entry of tdv is set to the current index in a step 511, and the process returns to the calling process.

In FIG. 5F, a process 600 describes the main loop of the application program, which performs message delivery, message processing, and possibly message sending. The process 600 is entered in a test 601 to determine if there is a message m in the receive buffer, that can be delivered. A "no" condition initiates a waiting process in a step 603, after which the check in step 601 is re-performed. A "yes" condition causes one of the messages to be delivered and the local dependency vector to be updated in a step 605 that calls Deliver_message(m) described previously. The message m is processed in a step 607. A test in a step 609 determines if a message needs to be sent. A "yes" condition initiates the Send_message step 610. A "no" condition initiates a test 611 to determine if further processing is needed. A "yes" condition for test 611 returns the process to step 607. A "no" condition returns the process to stp 601 to deliver the next message. The Send_message step 610 is shown in FIG. 5G. It enters in a step 602 in which the message content and its dependency vector are placed in the send buffer. A step 604 is performed to check the send buffer according to a process 700 to be described hereinafter, after which the process returns tot the calling step 610.

In FIG. 5H, the process 700 checks the send buffer to see if there is any message that can be sent out. The process is entered in a test 701 to determine if there is a next message m in the send buffer. A "no" condition initiates a process 750 for re-examining the send buffer as will be described in conjunction with FIG. 5I. A "yes" condition sets the process number j to 1 in a step 703. In a step 705, suppose the $j^{th}$ entry of m's dependency vector is denoted by $(t_j,x_j)$. A test 707 is performed to determine if $(t_j,x_j)$ corresponds to a stable state interval and so can be omitted. The test checks if there is an entry $(t_j,x'')$ in log [j] such that $x_j \leq x''$. A "yes" condition initiates a step 709 in which the $j^{th}$ entry of m's dependency vector is omitted or set to NULL. A "no" condition indicates that the $j^{th}$ entry cannot be omitted, which initiates a step 711 to increment j followed by a step 713 to compare j with N. A "no" condition for $j \geq N$ returns the process to step 705 to examine the next entry. A "yes" condition returns the process to step 701 to examine the next message.

In FIG. 5I, the send buffer is re-examined in a step 751. A test 753 is performed to determine if there is a next message m in the buffer. A "no" condition finishes the checking, and returns to the calling process. A "yes" condition initiates a test 755 to determine if the number of non-NULL entries in m's dependency vector is at most K. A "yes" condition causes m to be sent out in a step 757, after which the process returns to step 753 to test the next message. A "no" condition directly returns the process to step 753.

Turning to FIG. 5J, a process 800 is described for checkpoint activity performed by process $P_i$. In a step 801, all unlogged messages are recorded in storage, followed by a step 805 in which a checkpoint is recorded in storage. A step 807 inserts the current index into the set of log[i] as if $P_i$ has received a logging progress notification from itself that the current state interval has become stable due to the checkpoint. A step 809 sets the $i^{th}$ entry of tdv to NULL. A step 811 checks the send buffer to determine if there is any message that can be sent due to the additional stable state intervals, after which the process returns to $P_i$.

Turning to FIG. 5K, a process 900 describes inserting an entry (t,x') into a set S of entries in either the incarnation end table or the local log vector table. A test 901 checks if the set S contains an entry (t,x'). A "no" condition initiates a step 903 which simply adds the entry (t,x') to S. A "yes" condition initiates a step 905, in which the entry (t,x'') is replaced by another entry (t,x) where x is the maximum of x' and x''.

In FIG. 5L, a process 1000 is described for receiving a logging progress notification from another process in the form of a vector mlog. In a step 1001, the process number j is set to 1. A test 1003 detects if there is a next entry (t,x'') in mlog[j]. A "yes" condition initiates a step 1005 in which the entry (t,x'') is inserted into the set log[j], and the process returns to step 1003. A "no" condition increments j in a step 1007 and tests $j \geq N$ in step 1009. A "no" condition returns the process to set up 1003 to examine the next vector entry of mlog. A "yes" condition resets j to 1 in step 1011. In a step 1013, suppose the jth entry of tdv is denoted by (t,x). A test 1015 checks if there is any entry (t,x'') in log[j] such that $x \leq x''$. A "yes" condition indicates that (t,x) corresponds to a stable state interval and so is set to NULL in a step 1017. A "no" condition simply advances the check to the next entry by incrementing j in a step 1019. A "no" condition for the test 1021 indicates more entries to be checked. A "yes" condition initiates the Check_deliverability process in a step 1023, and the Check_send_buffer process in a step 1025, as shown in FIG. 5M.

In FIG. 5N, a process 1100 describes receiving a failure announcement from $P_j$ containing $(t,x')_j$. A step 1101 synchronously logs the entry, after which the entry is inserted into the set iet[j] in a step 1103 and into the set log[j] in a step 1105. Since the announcement contains both failure and stable state information, process Check_orphan is called for both the send bugger and the receive bugger in steps 1107 and 1109, respectively; Check_send_buffer is a called in a step 1111 and check-deliverability of called in a step 1113.

Finally, a step 1115 tests if P$_j$'s current state is orphan. A "no" condition returns the process to Pi. A "yes" condition initiates a step 1117 which invokes Rollback as will be described next.

In FIG. 5O, the process 1200 describes the Rollback process triggered by a failure announcement (t,x')j. In a step 1201, all unlogged messages are logged. A step 1203 restores the latest checkpoint that does not correspond to an orphan state. All checkpoints that follow are discarded in a step 1205. A step 1207 checks if there is a next logged message m after the restored checkpoint. A "no" condition initiates a step 1290 to be described later. A "yes" condition initiates a test 1209 in FIG. 5Q to determine if m is orphan. A "no" condition initiates a step 1213 in which m is replayed, after which the process returns to step 1210 to retrieve the next message. A "yes" condition stops the replay process, and m is discarded in a step 1211. A test 1215checks if there is a next logged message m. A "no" condition initiates a step 1290. A "yes" condition initiates a test 1217 to determine if m is orphan. A "yes" condition causes m to be discarded in a step 1221. A "no" condition initiates a step 1219 in which m is re-inserted into the receive buffer. This process repeats for all logged messages. In FIG. 5P, step 1290 is followed by incrementing the incarnation number in a step 1212 and incrementing the state interval number in a step 1214. The i$^{th}$ entry of tdv is set to the current index in a step 1216, after which P$_i$ resumes normal execution.

In FIG. 5R, the process 1300 describes restart after a failure. A step 1301 restores the last checkpoint. A test 1303 is performed to check if there is a next logged message m. A yes condition initiates a step 1305 to replay m, after which the next message is retrieved. A "no" condition leads to a step 1307 where the current index is denoted by (t,x'). A step 1309 generates a failure announcement to contain (t,x')$_i$. The incarnation number and the state interval number are incremented in steps 1311 and 1313, respectively, and tdv[i] is set to the current entry in a step 1315. In FIG. 5S, the entry (t,x') is inserted into the set iet[i] in a step 1317 and into the set log[i] in a step 1319, as if Pi has received a failure announcement from itself. In a step 1321, the failure announcement is logged, after which it is broadcast in a step 1323. After P$_i$ finishes the Restart process, it jumps to step 601 in the process 600 and waits for the next message.

APPENDIX I

1. A. Borg, W. Blan, W. Graetsch, F. Hermann, and W. Oberle, Fault tolerance under UNIX, *AGM Trans. Comput. Syst.*, 7(1):1–24, February 1989.
2. O. P. Damani and V. K. Garg. How to recover efficiently and asynchronolusly when optimism fails. In *Proc. IEEE Int. Conf. Distributed Comput Syst.*, pages 108–115, 1996.
3. E. N. Elnozahy, D. B. Johnson, and Y. M. Wang. A survey of rollback-recovery protocols in message-passing systems. Tech. Rep. No. CMU-CS-96-181, Dept. of Computer Science, Carnegie Mellon University (also available at ftp://ftp.cs.cmu.edu/user/mootaz/papers/S.ps), 1996.
4. E. N. Elnozahy and W. Zwaenpoel. On the use and implementation of message logging. In *Proc. IEEE Fault-Tolerant Computing Symp.*, pages 298–307, 1994.
5. Y. Huang and Y. M. Wang. Why optimistic message logging has not been used in telecommunications systems. In *Proc. IEEE Fault-Tolerant Computing Symp.*, pages 459–463, June 1995.
6. D. B. Johnson. Efficient transparent optimistic rollback recovery for distributed application programs. In *Proc. IEEE Symp. Reliable Distributed Syst.*, pages 86–95, October 1993.
7. D. B. Johnson and W. Zwaenepoel. Recovery in distributed systems using optimistic message logging and checkpointing. *J. Algorithms*, 11:462–491, 1990.
8. L. Lamport. Time, clocks and the ordering of events in a distributed system. *Commun. ACM*, 21(7)558–565, July 1978.
9. A. Lowry, J. R. Russell, and A. P. Goldberg. Optimistic failure recovery for very large networks. In *Proc. IEEE Symp. Reliable Distributed Syst.*, pages 66–75, 1991.
10. A. P. Sistla and J. L. Welch. Efficient distributed recovery using message logging. In *Proc. 8th ACM Symposium on Principles of Distributed Computing*, pages 223–238, August 1989.
11. S. W. Smith, D. B. Johnson, and J. D. Tygar. Completely asynchronous optimistic recovery with minimal rollbacks. In *Proc. IEEE Fault-Tolerant Computing Symp.*, pages 361–370, 1995.
12. R. E. Strom and S. Yemini. Optimistic recovery in distributed systems. *ACM Trans Comput Syst.*, 3(3):204–226, August 1985.
13. Y. M. Wang and W. K. Fuchs. Lazy checkpoint coordination for bounding rollback propagation. In *Proc. IEEE Symp. Reliable Distributed Syst.*, pages 78–85, October 1993.

Appendix II

```
type entry: (inc. int, ssi int)
var tdv: array [1 . . . N] of entry; /*dep. vector */
    /* log: logging progress notification */
    log: array [1 . . . N] of set of entry;
    */iet: incarnation end table */
    iet: array [1 . . . N] of set of entry;
    fa: entry;/* failure announcement */
    current: entry; /+ current index */
    K: int; /* degree of optimism */
Process P$_i$:
Initialize:
    ∀ j: tdv[j] = NULL;
    ∀ j: iet[j] = log[j] { }; */ empty set */
    current = (0, 1);
    Initialize K;
Receive_mesaage(m);
    Check_orphan ({m});
    if not discarded then
        Check_deliverability ({m});
        Receive_buffer = Receive_buffer ∪ {m};
Deliver_message (m):
    */ m is delivered only if m.deliver is true. */
    ∀ j: tdv[j[ = max (tdv[j], m.tdv[j]);
    current . . . si++; tdv[i] = current;
Check_deliverability (buffer);
    ∀m ∈ buffer; it ∀j tdb[j].inc ≠ m.tdv[j].inc:
        min(dtv[j],m.tdv[j] = (t,x)
        (t,x') ∈ log[j] x ≦ x'
    then m_deliver = true;
    else m_deliver = false;
Check_orphan (buffer);
    ∀m ∈ buffer; ∀ j:
        if ∃t: (t,x') ∈iet[j] t ≧ m.tdv[j].inc:
            x' < m.tdv[j].sii then discard m;
Send_message(data):
    put (data, tdv) in Send_buffer;
    Check_send_buffer;
Check_send_buffer:
    ∀m ∈ Send_buffer: ∀ j:
        if m.tdv[j] = (t,x) (t,x') ∈ log[j]x ≦ x'
        then m.tdv[j] = NULL;
    ∀m ∈ Send_buffer:
        if Number of non-NUL entries in m.tdv
            is at most K
        then send m:
    FIG. 2: K-optimistic logging protocol: Part 1 .
Restart */ after */:
    Restore last checkpoint;
```

-continued

Appendix II

```
Replay the logged messages that follow;
fa = current; current.inc++;
current.sii++; tdv[i] current;
Insert(iet[i], fa); INsert(log[i], fa);
Synchronously log fa; Broadcase fa;
Receive_failure_ann (j, t, x') /* from P_j */:
    Synchronously log the received announcement;
    Insert (iet[j], (t, x')); Insert (log[j], (t, x'));
    Check_orphan(Send_buffer);
    Check_orphan(Receive_buffer);
    Check_send_buffer;
    Check_deliverability(Receive_buffer);
    if tdv[j].inc ≦ t tdv[j].sii > x' then
        Rollback (j, t, x');
Rollback(j, t, w'):
    Log all the unlogged messages to the stable storage;
    Restore the latest checkpoint with tdv such that
        –tdv[j].inc ≦ t tdv [j].sii > x') . . . (I)
    Discard the checkpoints that follow;
    Replay the messages logged after restored checkpoint
        till condition (I) is not satisfied;
    Among remaining logged messages, discard orphans
        and add non-orphans to Receive_buffer;
    /* These messages will be delivered again */
    current.inc++; current.sii++; tdv[i]=current;
Checkpoint:
    Log all the unlogged messages;
    Take checkpoint;
    Insert(log[i], current);
    tdv[i] = NULL;
    Check_send_buffer;
Receive_log (mlog);
    ∀ j, t; (t, x') ∈ mlog[j]; Insert (log[j], (t, x'));
    ∀ j; if tdv(j) = (t, x) (t, x') ∈ log[j] x ≦ x'
        then tdv[j] = NULL;
    Check_deliverability(Receive_buffer);
    Check_send_buffer;
    Insert(se, (t, x'));
    if (t, x') ∈ se then /* entry for inc. t exists in se*/
        se* = (se – {(t, x')}) ∪ {(t,max(x', x'))}
    else se = se ∪ {t, x'};
```

While the invention has been described in a preferred embodiment, various changes may be made therein without departing from the spirit and scope of the invention as defined in the appended claims, in which:

We claim:

1. In a message passing system having a plurality of interconnected processors which include storage and a watchdog process and wherein the processors may undergo failure, a method for restoring a consistent system state using optimistic logging protocol with asynchronous recovery for a plurality of processes, comprising the steps of:
   a) performing transitive dependency tracking of messages and process states to record a highest-index state interval of each process upon which a local process depends by:
      i) attaching a variable size dependency vector to each outgoing message sent between processes;
      ii) assigning an integer K to each outgoing message as the upper bound on the vector size; and
      iii) updating a local dependency vector associated with the local process upon receiving each incoming message.

2. The method of claim 1 further comprising the steps of:
   b) detecting a process failure and re-starting the failed process by:
      i) restoring a latest checkpoint and replaying logged messages;
      ii) starting a new incarnation of the failed process identified by Pi, t where (i) is the process number and (t) is the incarnation number, each state interval being identified by $(t,x)_i$ where (x) is the state interval number; and
      iii) broadcasting a failure announcement to the other processes, the announcement containing $(t,x)_i$ where (x) is the state interval number of the last recreatable state interval of the failed process incarnation Pi, t.

3. The method of claim 2 further comprising the steps of:
   c) receiving a failure announcement containing $(t, x)_i$ and performing the following steps:
      i) extracting from the local dependency vector the entry for process (i) by each process;
      ii) comparing the entry for process (i) to the $(t,x)_i$ contained in the failure announcement;
      iii) classifying the process as orphaned from the comparison if the process depends upon a higher-index state interval than $(t,x)_i$; and
      iv) performing a process roll-back to reconstruct only non-orphaned state intervals in the rolled-back process.

4. In a message passing system having a plurality of interconnected processors which include storage and a watchdog process and wherein the processors may undergo failure, a method for restoring a consistent system state using optimistic logging protocol with asynchronous recovery, comprising the steps of:
   a) initializing processes in the system wherein each process comprises a sequence of state intervals;
   b) establishing checkpoints in each process by saving in storage the state of the process sufficient to re-start execution of the process;
   c) logging non-deterministic event messages in storage by each process for replay after process re-start to reconstruct pre-failure state intervals;
   d) performing transitive dependency tracking of messages and process states to record the highest-index state interval of each process upon which a local process depends by:
      i) attaching a variable size dependency vector to each outgoing message sent between processes;
      ii) assigning an integer K to each outgoing message as the upper bound on the vector size;
      iii) updating a vector for the local process upon receiving each incoming message;
   e) detecting a process failure and re-starting the failed process;
   i) restoring the latest checkpoint and replaying the logged messages;
      ii) starting a new incarnation of the failed process identified by Pi,t where (i) is the process number and (t) is the incarnation number, each state interval being identified by $(t,x)_i$ where (x) is the state interval number;
      iii) broadcasting a failure announcement to the other processes, the announcement containing $(t,x)_i$ where (x) is the state interval number of the last recreatable state interval of the failed process incarnation Pi,t;
   f) receiving a failure announcement containing (t,x)i and performing the following steps:
      (i) extracting from the local dependency vector the entry for process (i) by each process;
      ii) comparing the entry for process (i) to the $(t,x)_i$ contained in the failure announcement;
      iii) classifying the process as orphaned from the comparison if the process depends upon a higher-index state interval than $(t,x)_i$; and
      iv) performing process roll-back to reconstruct only non-orphaned state intervals in the rolled-back process.

5. The method of claim 4 further comprising the step of omitting vector entries in the dependency vector corresponding to state intervals that have become stable.

6. The method of claim 4 further comprising the step of sending a message if a process vector size is less than or equal to K.

7. The method of claim 4 further comprising the step of periodically broadcasting a logging progress notification by each process to let other processes know which of its state intervals is stable.

8. The method of claim 4 further comprising the step of starting a new state internal upon receiving a non-deterministic event from another process.

9. The method of claim 4 wherein the integer K is between 0 and N, and N is the total number of processes.

10. The method of claim 4 wherein K indicates the maximum number of processes whose failure may revoke the message.

11. The method of claim 4 wherein the storage maybe volatile or non-volatile.

12. The method of claim 4 wherein a state interval is stable when the state interval is recreatable from information saved in storage.

* * * * *